United States Patent
Whiting

(12) 
(10) Patent No.: US 9,215,285 B2
(45) Date of Patent: Dec. 15, 2015

(54) MULTI-POINT SOCIAL MEDIA GEOTRACKER

(75) Inventor: Jacob A. Whiting, Hopkins, MN (US)

(73) Assignee: Targets Brands, Inc., Minneapolis, MN (US)

(*) Notice: Subject to any disclaimer, the term of this patent is extended or adjusted under 35 U.S.C. 154(b) by 473 days.

(21) Appl. No.: 13/421,594

(22) Filed: Mar. 15, 2012

(65) Prior Publication Data

US 2013/0132808 A1    May 23, 2013

Related U.S. Application Data

(60) Provisional application No. 61/561,239, filed on Nov. 17, 2011.

(51) Int. Cl.
- G06F 17/22 (2006.01)
- H04L 29/08 (2006.01)
- H04W 4/18 (2009.01)

(52) U.S. Cl.
CPC .............. H04L 67/18 (2013.01); H04L 67/26 (2013.01); H04W 4/185 (2013.01)

(58) Field of Classification Search
CPC . G06F 17/30017; G06F 17/241; H04L 67/26; H04L 67/18; H04W 4/185
USPC ......... 715/202, 205, 234, 244, 245, 247, 712, 715/763, 809, 818, 855, 859; 701/400, 409, 701/412, 416, 418, 425, 440, 446, 447, 453, 701/454, 461
See application file for complete search history.

(56) References Cited

U.S. PATENT DOCUMENTS

| | | | |
|---|---|---|---|
| 6,381,603 B1* | 4/2002 | Chan et al. | 707/724 |
| 7,707,140 B2* | 4/2010 | Leishman et al. | 707/999.003 |
| 8,155,669 B2* | 4/2012 | Ziskind et al. | 455/456.3 |
| 8,260,775 B2* | 9/2012 | Ahn et al. | 707/724 |
| 8,375,208 B2* | 2/2013 | Darapu et al. | 713/168 |
| 8,433,512 B1* | 4/2013 | Lopatenko et al. | 701/426 |
| 2002/0042819 A1* | 4/2002 | Reichert et al. | 709/217 |
| 2002/0143462 A1* | 10/2002 | Warren | 701/200 |
| 2002/0199018 A1* | 12/2002 | Diedrich et al. | 709/245 |
| 2005/0027705 A1 | 2/2005 | Sadri et al. | |
| 2005/0216464 A1* | 9/2005 | Toyama et al. | 707/9 |
| 2007/0260741 A1* | 11/2007 | Bezancon | 709/230 |

(Continued)

FOREIGN PATENT DOCUMENTS

| | | |
|---|---|---|
| EP | 2249261 A1 | 11/2010 |
| WO | 2008072093 A2 | 6/2008 |

OTHER PUBLICATIONS

"Applying Spatiotemporal and Demographic Data to Locate Next Crime", Feb. 22, 2010, pp. 1-16.*

(Continued)

*Primary Examiner* — Maikhanh Nguyen
(74) *Attorney, Agent, or Firm* — Merek, Blackmon & Voorhees, LLC

(57) ABSTRACT

A database server stores information about content posted to multiple content storage servers. A client device makes a reading request for information from the database server about content posted to content storage servers within a span of locations selected by a user and within a span of time selected by a user. The database server stores information about content posted to multiple content storage servers in response to a loading request for content posted within a distance of multiple locations.

20 Claims, 19 Drawing Sheets

(56) References Cited

U.S. PATENT DOCUMENTS

| | | | |
|---|---|---|---|
| 2007/0271367 A1* | 11/2007 | Yardeni et al. | 709/223 |
| 2008/0098090 A1* | 4/2008 | Geraci et al. | 709/219 |
| 2008/0235085 A1 | 9/2008 | Kovinsky et al. | |
| 2008/0301580 A1* | 12/2008 | Hjelmeland Alams et al. | 715/808 |
| 2010/0063879 A1* | 3/2010 | Araradian et al. | 705/14.53 |
| 2011/0173193 A1* | 7/2011 | Ahn et al. | 707/725 |
| 2011/0246910 A1 | 10/2011 | Moxley et al. | |
| 2011/0289317 A1* | 11/2011 | Darapu et al. | 713/168 |
| 2012/0023085 A1 | 1/2012 | Bellerive et al. | |
| 2012/0109751 A1* | 5/2012 | Binenstock et al. | 705/14.58 |

OTHER PUBLICATIONS

The Economist, Crime Prediction, Time Bandits, Prospective "hot-spot" map show where criminals are going to be active, May 6, 2004, 2 pages.*

Bryan Hill, "Narrowing the Search: Utilizing a Probability Grid in Tactical Analysis", Jul. 17, 2001, 22 pages.*

TACTweet Advanced—Searching by Key Words within GEOCODES, http://www.youtube.com/watch?v=QBHvDOI9vKA, Apr. 11, 2011, 2 pages.

Tactical Tweeting for Intelligence & Law Enforcement Operations www.tactweet.com, http://www.youtube.com/watch?v=T6bOwdbThCg, Jan. 28, 2011, 2 pages.

Open Source: Breaking www.tactweet.com, https://sites.google.com/site/tacticalllc/, Feb. 1, 2012, 4 pages.

IDS Submission, transcription of audio portion of video for http://www.youtube.com/watch?v=QBHvDOI9vKA as of Jul. 18, 2012, 2 pages.

Office Action from Canadian Patent Application No. 2,780,336, mailed on Jun. 7, 2013 (4 pages).

Office Action from Canadian Patent Application No. 2,780,336, mailed Feb. 26, 2014 (2 pages).

Office Action from Canadian Patent Application No. 2,780,336, mailed Oct. 16, 2013 (2 pages).

Joseph Straw, "Bird's Eye View," Security Management: Security's Web Connection, retrieved Nov. 10, 2011, http://www.securitymanagment.com.

Toyotaro Suzumura et al., "StreamWeb: Real-Time Web Monitoring with Stream Computing," 2011 IEEE International Conference on Web Services, IBM Research—Tokyo, Tokyo Institute of Technology, 2011.

Applications Prototype Lab Blog: Twitter & ESRI's Silverlight API, Dec. 16, 2009.

Office Action from Canadian Patent Application No. 2,780,336, mailed Jun. 9, 2015 (5 pages).

* cited by examiner

| POSTING ID 702 |
|---|
| LOCATION LATITUDE 704 |
| LOCATION LONGITUDE 706 |
| CONTENT TYPE 708 |
| CONTENT TEXT 710 |
| CONTENT AUTHOR 712 |
| URL TO AUTHOR IMAGE 714 |
| URL TO CONTENT PAGE 716 |
| POSTING TIME 718 |
| POSTING DATE 720 |

| LOCATION ID 902 |
|---|
| LOCATION LATITUDE 904 |
| LOCATION LONGITUDE 906 |
| LOCATION TYPE 908 |
| LOCATION DISPLAY NAME 910 |
| LOCATION INTERNAL NAME 912 |
| LOCATION ADDRESS 914 |

| ICON ID 1002 |
|---|
| POSTING/LOCATION TYPE 1004 |
| ICON IMAGE URL 1006 |

MULTI-POINT SOCIAL MEDIA GEOTRACKER

REFERENCE TO RELATED APPLICATIONS

This application claims priority from U.S. Provisional Application 61/561,239 filed on Nov. 17, 2011, which is hereby incorporated by reference in its entirety.

BACKGROUND

Internet-connected mobile devices, such a phones, tablet computers, gaming devices, and laptop computers, have given people the ability to share information about their current activities. Typically, this information is captured or created by the person controlling the mobile device and then is uploaded through the Internet to a server where it is stored and distributed to others. This information can include short messages, pictures, and video. In addition, the information that is uploaded can be tagged with position information that describes the current location of the mobile device. This position information can be in the form of longitude and latitude values or less exact values such as the name of a building or street.

The discussion above is merely provided for general background information and is not intended to be used as an aid in determining the scope of the claimed subject matter. The claimed subject matter is not limited to implementations that solve any or all disadvantages noted in the background.

SUMMARY

A list of multiple preset locations is retrieved and for each preset location, a stream of content postings currently being posted to a content storage server from within a limited area around the preset location is requested.

In accordance with a further embodiment, information about content postings is received, wherein the information is limited to content postings that are posted from within a set distance of at least one of a plurality of locations such that information for at least one excluded content posting is excluded from being received because the excluded content posting was posted farther than the set distance from all of the plurality of locations. The received information is stored in a database. The database is searched for information about content postings that were posted within a first time span to identify a plurality of content postings, wherein a first identified content posting was posted within the set distance of a first location in the plurality of locations and a second identified posting was posted within the set distance of a second location in the plurality of locations. Using a processor, a first web page is generated to display icons for each of the plurality of content postings that were identified during the searching.

In accordance with an additional embodiment, a database server stores information about content posted to multiple content storage servers from locations that are positioned within a radius of a plurality of preset locations. A client device makes a reading request for information from the database server about content posted to the multiple content storage servers within a span of time selected by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described below provide a stream of content postings, where each posting in the stream has been posted within a set distance of one of a plurality of selected locations. For example, a single request for postings will return all postings within a quarter-mile of five separate locations. Postings that are outside of these areas are not returned and thus are excluded from the returned results. The postings that are returned may be further filtered based on keywords such that only postings containing one or more of the keywords are returned.

The stream of postings is saved in a database together with the time and date that each posting was posted and the location where the posting was posted. A server searches the database to identify those postings that satisfy parameters set by a user through a web page. Those parameters can include filter terms that must be in the posting, a time span during which the postings must have been posted, and a geographical span where the posting must have been posted. The server then constructs a refreshed web page that displays a map with icons positioned on the map for each of the postings that meet the parameters set by the user.

Figure 1:
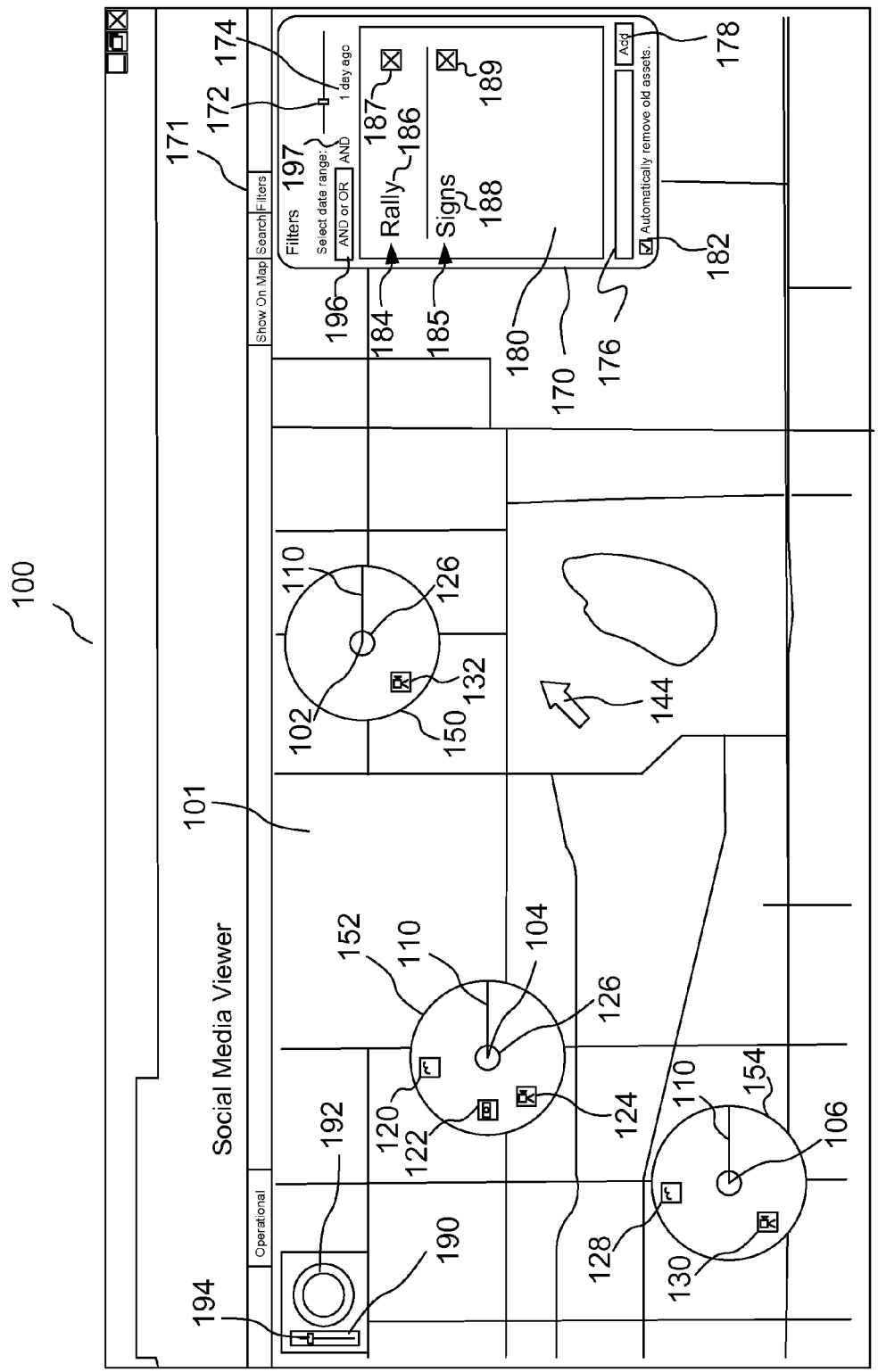
FIG. 1 is an example of a user interface showing a mapping output of posted content.

FIG. 1 provides an example of a user interface 100 showing a view of a map 101 with icons representing content postings displayed on top of the map. The icons represent content postings that were posted within a set distance 110 of three preset locations 102, 104, 106. Circular shapes 150, 152, and 154, which may be a different color from the rest of the map, encircle areas around preset locations 102, 104, and 106 that are within set distance 110 of the preset locations. In accordance with some embodiments, circular shapes 150, 152 and 154 may not be displayed. In the example shown in FIG. 1, there are three types of content postings, represented by three separate icons: a bird icon, such as icons 120 and 128, to represent text postings; a camera icon, such as icon 122, to represent photograph postings; and a video camera icon, such as icons 124, 130 and 132, to represent video postings. Preset locations 102, 104 and 106 are represented by circle icons, such as icon 126. As described further below, hovering a pointer 144 over one of the content posting icons or clicking on one of the content posting icons causes a window to open near the icon. At least part of the content found in the posting is displayed within the window.

User interface 100 also includes a filter window 170, which is displayed in response to the user selecting filter button 171. Filter window 170 includes filter time span slider 172, filter time span text 174, filter term input box 176, Add term button 178, filter term box 180, and check box 182.

Filter time span slider 172 is used to filter out content postings that occurred within set distance 110 of a preset location based on when they were posted. In particular, filter time span slider 172 sets a time span that is used to calculate a date/time range for content postings such that any postings that occurred outside of that range are not displayed. In accordance with some embodiments, this date/time range is defined by an ending time point that is set to the date and time that the search is initiated and a beginning time point that is set to the date and time that is separated from the ending time point by an amount equal to the time span. For example, if a search is initiated on January 28$^{th}$ at 2:00 p.m., and filter time span slider 172 has been used to set the time span to two days, the date range for the search will have a starting time point of January 26$^{th}$, 2:00 p.m. and an ending time point of January 28$^{th}$, 2:00 p.m.

Filter time span slider 172 may be shifted left and right by dragging the slider using an input device. As filter time span slider 172 is shifted, the filter time span is altered and filter time span text 174 is changed to reflect the current filter time span.

Filter term input box 176 accepts filter terms input by a user. When the user selects Add term button 178, an entry containing the text in filter term input box 176 is added to filter term box 180. If there is already an entry in filter term box 180 when Add term button 178 is selected, the existing entries are shifted downward within filter term box 180 and the newly added text is inserted as the topmost entry. Thus, entries accumulate in filter term box 180 as Add term button 178 is pressed. For example, in FIG. 1, filter term box 180 contains entries 184 and 185, which were added to filter term box 180 by first adding entry 185 based on a first selection of Add term button 178 and then adding entry 184 while shifting entry 185 downward in response to a second selection of Add term button 178. Entry 184 contains filter text 186 consisting of the word "Rally" and delete button 187, which when selected removes entry 184 from filter term box 180. Entry 185 contains filter text 188 consisting of the word "Signs" and delete button 189, which when selected removes entry 185 from filter term box 180.

The text in filter term box 180 is used to filter the content postings that are displayed on user interface 100. In particular, the text in filter term box 180 is used to filter the content postings that are posted within set distance 110 of the preset locations displayed on user interface 100. In accordance with one embodiment, the terms in filter term box 180 are ANDed together such that only those postings that include all of the terms in filter term box 180 are displayed in user interface 100. In accordance with other embodiments, the terms in filter term box 180 are ORed together such that only those postings that include at least one of the terms in filter term box 180 are displayed in user interface 100. An AND-OR control 196 may be selected by the user to control whether the search terms are ANDed or ORed together. An AND-OR designation 197 indicates whether the terms are currently being ANDed or ORed together.

Check box 182 is used by the user to control whether postings displayed on user interface 100 are removed when they are no longer within the time span set by filter time span slider 172. When check box 182 is checked, icons for postings are removed from user interface 100 automatically when the time span between when the postings were posted and the current time exceeds the time span set by filter time span slider 172. When check box 182 is not checked, icons for postings remain on user interface 100 even after they no longer fit within the time span requirement set by filter time span slider 172.

The user may change the area of the map shown on user interface 100 by panning the map and changing the zoom level of the map. To pan the map, the user places the cursor 144 on the map, presses a button on the pointing device, and drags the cursor while continuing to press the button. The user may also pan the map using pan control 192. In particular, pressing the top of pan control 192 causes the map to pan upwards, pressing the bottom of pan control 192 causes the map to pan downwards, pressing the left part of pan control 192 causes the map to pan to the left and pressing the right part of pan control 192 causes the map to pan to the right. The user may change the zoom level using zoom control 190, which includes a slide 194. Moving slide 194 upward changes the zoom level to show a smaller part of the map in more detail and moving slide 194 downward changes the zoom level to show a larger part of the map.

Figure 2:
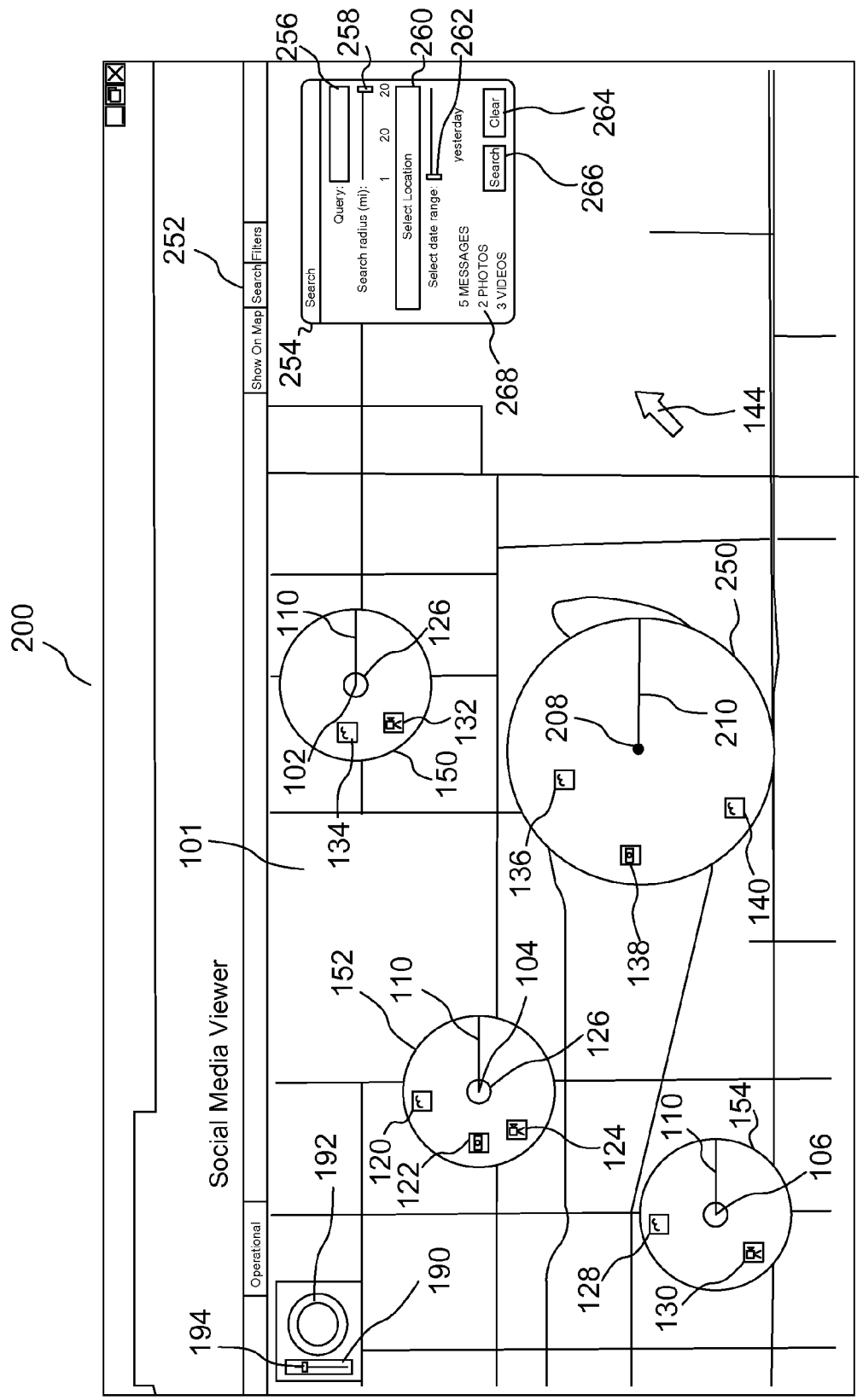
FIG. 2 is a second example of a user interface showing a mapping output of posted content.

FIG. 2 provides an example of a user interface 200 showing a view of map 101 with additional icons 134, 136, 138 and 140 displayed on top of the map. In FIG. 2, a search button 252 has been pressed. In response, filter box 170 of FIG. 1 has been replaced with search box 254.

Search box 254 is used to designate an additional area, such as area 250, from which postings are to be captured. To designate the additional area, the user selects Select Location button 260 then selects a point on map 101 as the center of the additional area. To select the point on map 101, the user positions pointer 144 at the point, such as point 208, and presses a select key on an input device. The radius 210 of the designated area is set using search radius slider 258. By using the pointer 144, a user slides search radius slider 258 between a minimum radius and a maximum radius. Terms that are used to filter the postings are input by the user in query box 256. The filtering operation limits the content postings to those postings that contain the query term or phrase. To submit the search term for filtering, the user enters the search term in query box 256 and then selects Search button 266. The time span during which the postings must be posted is set using time span slider 262. Postings that are further back in time than the time span set by time span slider 262 are filtered out and are not presented in user interface 200.

Search radius slider 258, time span slider 262 and query box 256 only control the appearance of postings for the additional designated location and do not impact which postings near the preset locations are displayed.

Search box 254 also includes a clear button 264, which when selected causes designated area 250 and the postings within designated area 250 to be removed from user interface 200. A postings summary area 268 is also provided in search box 254 and provides a count of each type of posting currently being shown on user interface 200. For example, postings summary area 268 indicates that there are 5 message postings, 2 photo postings and 3 video postings shown on user interface 200.

Figure 3:
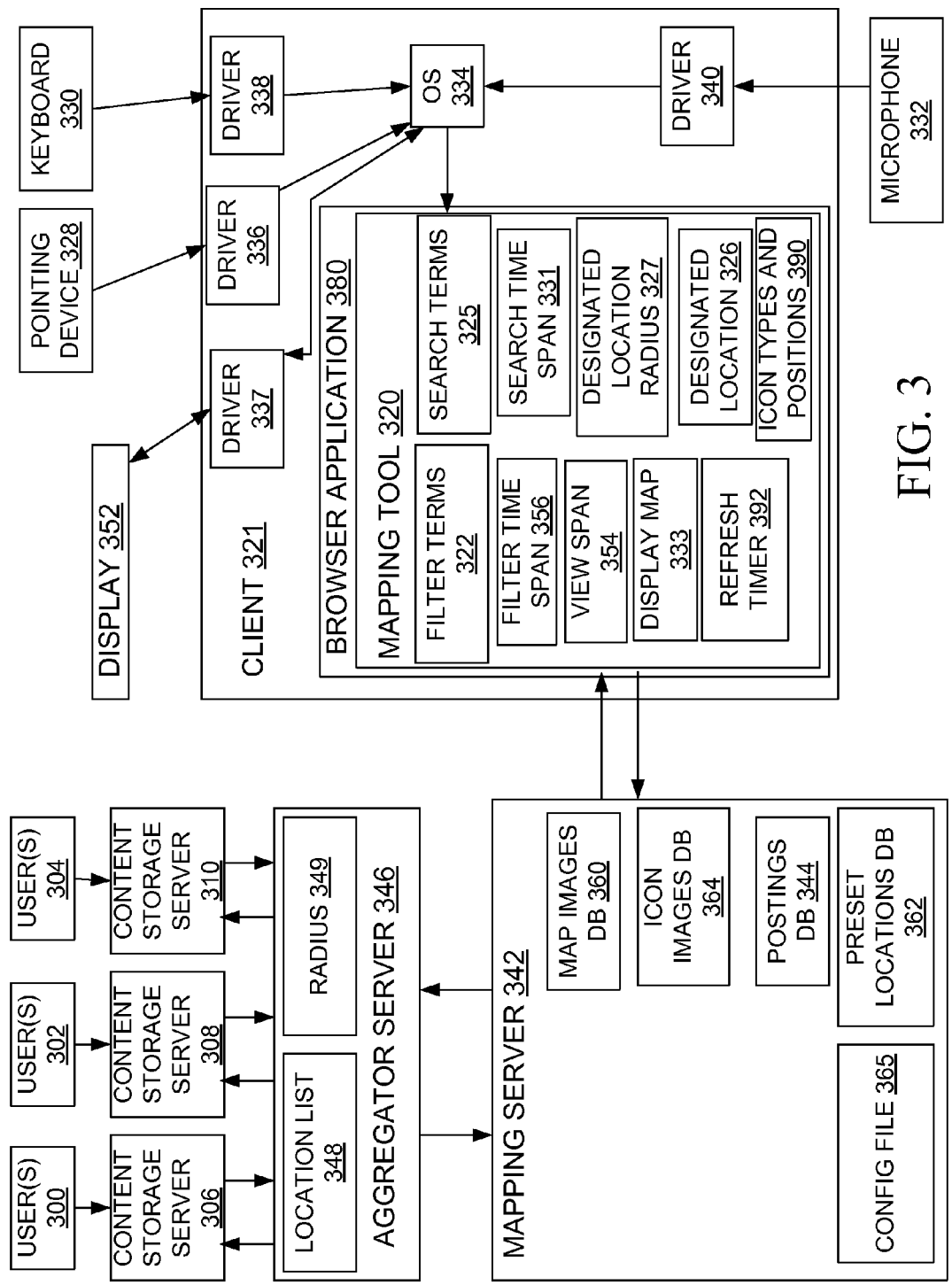
FIG. 3 is a block diagram of elements used to obtain posted content relative to multiple locations.

FIG. 3 provides a block diagram of elements used to form the user interfaces of FIGS. 1 and 2. In FIG. 3, user(s) 300, 302 and 304 generate content such as text messages, pictures and videos and upload or post the content to content storage servers 306, 308, and 310. The items uploaded to content storage servers 306, 308, 310 are referred to as content or alternatively as postings. In some embodiments, a different content storage server is provided for each type of content. For example, one content storage server for text messages, one content storage server for pictures, and one content storage server for videos.

Aggregator server 346 uses the longitudes and latitudes of a plurality of preset locations 348 and a radius 349 around each preset location 348, to request separate content streams from content storage servers 306, 308 and 310. Based on the criteria provided by aggregator server 346, content storage servers 306, 308 and 310 filter content as it is posted to the content storage servers to identify matching content. In particular, content storage servers 306, 308 and 310 identify those postings that are posted within radius 349 of at least one of the preset locations 348 as matching postings. For each matching posting, an XML document containing information about the matching posting is created and is forwarded in a stream to aggregator server 346. Aggregator server 346 aggregates the separate streams provided by the content storage servers into a single stream that is then returned to a mapping server 342. Mapping server 342 parses the XML documents in the stream and stores the information about the content in postings database 344. The streaming will generally continue until terminated by mapping server 342.

Aggregator server 346 can also request separate content streams from content storage servers 306, 308 and 310 based on a designated location 326 and designated location radius 327 provided by a mapping tool 320 on a client 321 via mapping server 342. Designated location 326 is set by the user by pressing Select Location button 260 of FIG. 2 and then selecting a point on the map. Designated location radius 327 is set by the user through search radius slider control 258. Based on the designated location 326 and designated location radius 327 provided by aggregator server 346, content storage servers 306, 308 and 310 filter content as it is posted to the content storage servers to identify content that was posted within designated location radius 327 of designated location 326. For each matching posting, an XML document containing information about the matching posting is created and is forwarded in a stream to aggregator server 346. Aggregator server 346 aggregates the separate streams provided by the content storage servers into a single stream that is then returned to mapping server 342. Mapping server 342 parses the XML documents in the stream and stores the information about the content in postings database 344. Within postings database 344, the content posted within designated radius 327 of designated location 326 will be separately identifiable from the content posted within radius 349 of one of the preset locations 348. The streaming will generally continue until terminated by mapping server 342.

Mapping tool 320 on client device 321 receives filter terms 322, filter time span 356, search terms 325, designated location 326, search time span 331, and designated-location radius 327 from a user through one or more input devices such as pointing device 328, keyboard 330, touch sensitive display 352 and microphone 332. Each of the input devices communicates with operating system 334 through a respective driver 336, 338, 337 and 340. Operating system 334 then provides the input values to mapping tool 320. In several embodiments, mapping tool 320 is a web page provided by mapping server 342 and executed within a browser application 380 on client 321.

Periodically and/or in response to a user input, mapping tool 320 makes a refresh call to mapping server 342 to request postings in postings database 344 that meet the parameters set by filter terms 322, filter time span 356, search terms 325, designated location 326, search time span 331, designated-location radius 327, and a view span 354. View span 354 represents the vertical and horizontal span of a requested view of displayed map 333. In accordance with one embodiment, the vertical and horizontal spans 354 are provided in terms of longitude and latitude values. Specifically, the longitude and latitude values of the upper-left corner of the requested view and the longitude and latitude values of the lower-right corner of the requested view.

During the refresh, mapping server 342 determines if new map images need to be returned to client 321 based on differences between the last map view span and the requested map view span. Such map images are stored in a map image database 360 in mapping server 342. In addition, mapping server 342 uses the requested view span and the other parameters provided by mapping tool 320 to perform two searches on postings database 344. In the first search, mapping server 342 searches postings database 344 for all postings that are within radius 349 of at least one preset location 348, were posted within the filter time span 323, match the filter search terms 322 and were posted at a position that is located within the requested view span 354. Filter time span 356 is set by the user through time span slider 172 and filter search terms 322 are the terms in filter term box 180 of FIG. 1. In the second search, mapping server 342 searches postings database 344 for all postings that are within the designated-location radius 327 of designated location 326, were posted within the search time span 331, match the search terms 325 and were posted at a position that is located within the requested view span 354. Search time span 331 is set by the user through time span slider 262 of FIG. 2 and search terms 325 are the terms entered in query box 256. Mapping server 342 also searches a preset locations database 362 for all preset locations that are positioned within the requested view span 354.

After searching postings database 344 and preset locations database 362, mapping server 342 returns a refreshed mapping tool 320 with icon types and position information 390 that includes information about the matching postings and matching preset locations and associated icon images from icon images database 364. In accordance with one embodiment, a separate icon is provided for each type of content posting. Icons are also provided for each preset location and for the designated location. Based on the information in refreshed mapping tool 320, browser application 380 renders a page showing the map view and the returned icons on display 352.

As discussed further below, mapping tool 320 is refreshed in response to user input or in response to a refresh timer 392 programmed in mapping tool 320 that requests refreshment of the icons displayed on the map at set intervals. In accordance with some embodiments, refresh timer 392 requests an update to the icons by posting a request back to mapping server 342 to refresh mapping tool 320. In accordance with some embodiments, the request to refresh mapping tool 320 based on the expiration of timer 392 is limited to refreshing the icons and not the images of the map. This reduces flicker on the page and increases the speed at which the icons can be updated.

The operation of embodiments is discussed further below by referring to a number of events that can occur. The first event is a home screen request event. Such an event is triggered when mapping tool 320 is first requested and when the user selects an icon on the user interface to return to the home screen.

Figure 4:
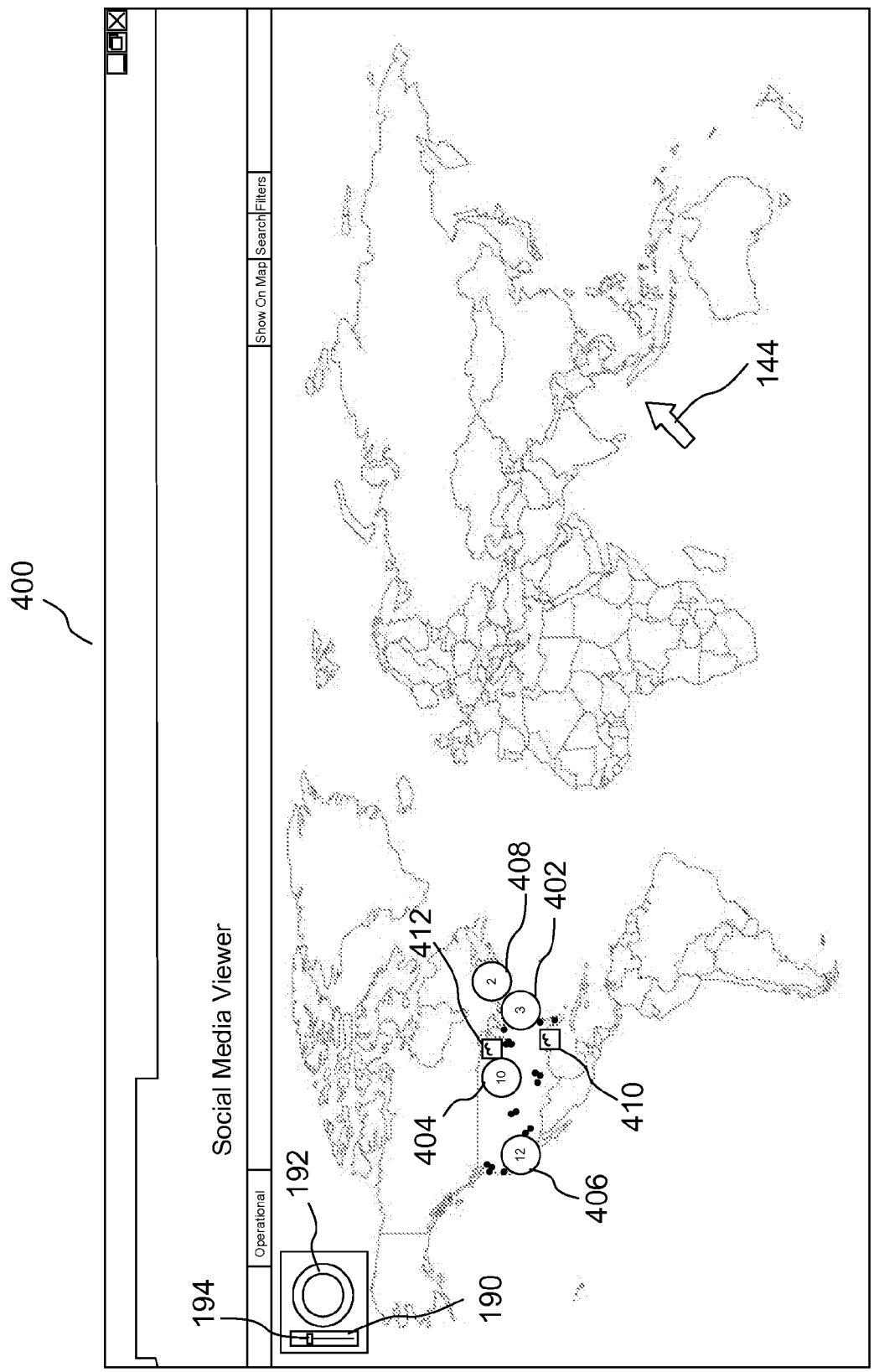
FIG. 4 is a user interface showing an example of a home screen.

FIG. 4 provides an example of a home screen 400 that include postings icons 402, 404, 406, 408, 410 and 412. Postings icons 402, 404, 406, and 408 are multi-posting icons that each represents a plurality of content postings. Each of postings icons 402, 404, 406, and 408 include a number in a circle with the number indicating the number of postings that are represented by the icon. Postings icons 410 and 412 each represent individual message postings. Although picture and video postings icons are not depicted in FIG. 4, such postings icons could be displayed on the home screen.

Figure 5:
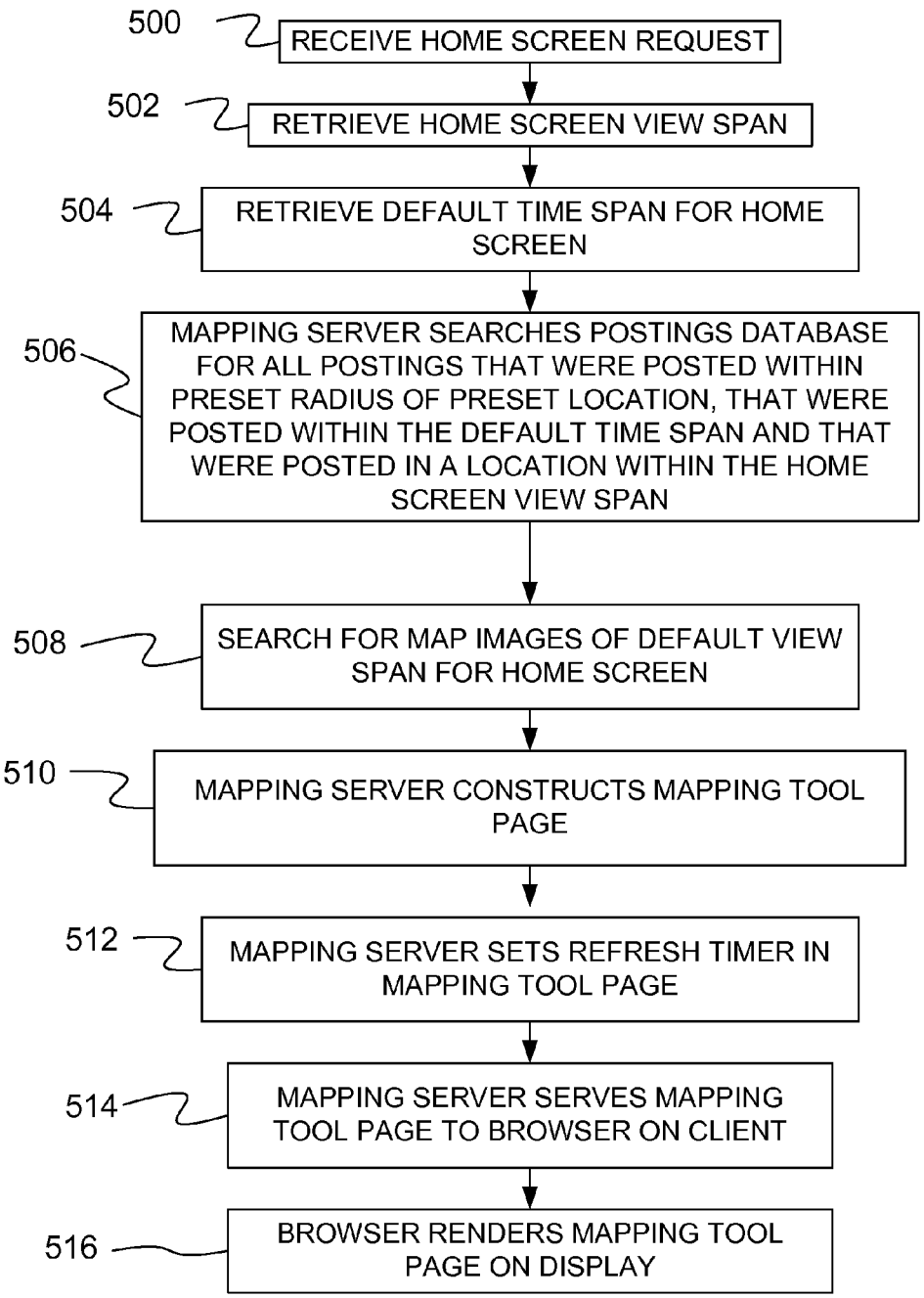
FIG. 5 is a flow diagram of steps performed in response to a home screen event.

FIG. 5 provides a flow diagram of a method of displaying the home screen. At step 500, mapping server 342 receives a request for the home screen. At step 502, mapping server 342 retrieves the default view span stored for the home screen from a configuration file 365. At step 504, mapping server 342 retrieves a default filter time span for the home screen from configuration file 365.

At step 506, mapping server 342 searches postings database 344 for all postings that are within the preset location radius of at least one preset location in preset location database 362, that were posted within the default filter time span and that were posted at a location that is within the default view span for the home screen. At step 508, mapping server 342 searches map images database 360 for map images that reflect the default view span of the home page.

At step 510, mapping server 342 constructs mapping tool page 320 by including references to the file paths of map images found in step 508 and by designating icons to be displayed on the map images. The designation of the icons includes a designation of an image to use as the icon and a location on the map images where the icon image should be positioned. This information is shown as icon types and positions 390 in FIG. 3. In accordance with one embodiment, icons are designated for each posting returned by the search of postings database 344 at step 506. When designating the icons, mapping server 342 may replace overlapping icons with a single icon that includes a number indicating the number of icons that are overlapping. In accordance with some embodiments, icons that represent multiple overlapping icons are interactive such that if a user selects such an icon, it is converted into multiple icons such that the user can gain access to each of the postings represented by the single icon.

At step 512, mapping server 342 sets a refresh timer 392 in mapping tool page 320. When the refresh timer 392 in mapping tool page 320 expires, mapping tool page 320 will request a refresh of the postings icons from mapping server 342. In accordance with one embodiment, mapping server 342 sets refresh timer 392 to thirty seconds. In response to the refresh request, mapping server 342 will perform a new search of the postings database 344 to identify new postings that are within the default preset location radius of at least one preset location, that were posted within the default filter time span and that were posted at a location that is within the default view span for the home screen. During such a refresh request, postings that were previously displayed may be removed because they no longer fall within the default filter time span.

At step 514, mapping server 342 serves mapping tool page 320 to client 321. At step 516, browser application 380 executes mapping tool page 320 and renders the map images and icons on display 352.

Figure 6:
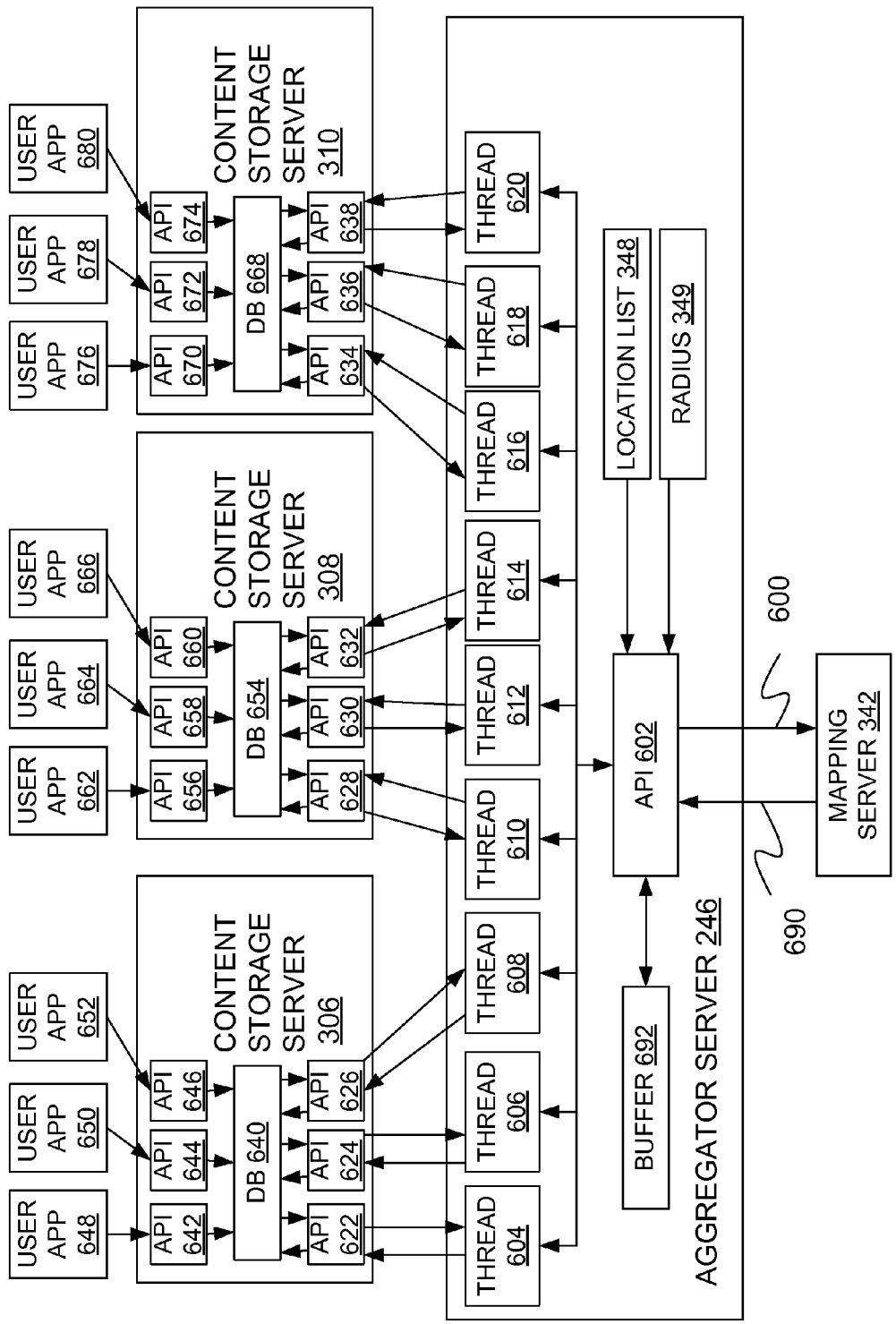
FIG. 6 is a more detailed block diagram of elements used to perform multi-threaded processing to receive posted content streams.

To provide the bandwidth needed to convey postings from areas around multiple locations, some embodiments utilize multiple processing threads. FIG. 6 provides a more detailed block diagram of aggregator server 346 and content storage servers 306, 308 and 310 that utilize multiple threads to stream content postings to mapping server 342. To initiate the stream, mapping server 342 sends a stream request 600 to an Application Programming Interface 602 in aggregator server 346. Application Programming Interface (API) 602 then creates a plurality of processing threads to provide the necessary bandwidth to handle receiving posting streams for multiple locations simultaneously. In accordance with one embodiment, a separate processing thread is opened for each location/content storage server combination. For example, if there were ten preset locations in location list 348 and three content storage servers, API 602 would create thirty processing threads, with ten processing threads for each content storage server. In the example of FIG. 6, a total of nine processing threads 604, 606, 608, 610, 612, 614, 616, 618, and 620 are created. Processing threads 604, 606 and 608 are created to request streams from content storage server 306; processing threads 610, 612, and 614 are created to request streams from content storage server 308; and processing threads 616, 618 and 620 are created to request streams from content storage server 310. In addition, processing threads 604, 610 and 616 request streams relative to a first preset location; processing threads 606, 612 and 618 request streams relative to a second preset location; and processing threads 608, 614 and 620 request streams relative to a third preset location.

Each processing thread calls a separate instance of a streaming API in a content storage server. Specifically, threads 604, 606 and 608 call separate instances 622, 624 and 626 of a streaming API in content storage server 306; threads 610, 612 and 614 call separate instances 628, 630, and 632 of a streaming API in content storage server 308; and threads 616, 618 and 620 call separate instances 634, 636, and 638 of a streaming API in content storage server 310.

In content storage server 306, each API instance 622, 624 and 626 searches a postings database 640 for postings within the default radius of the location assigned to the API instance. Thus, API instance 622 searches for postings within the default radius of the first preset location; API instance 624 searches for postings within the default radius of the second preset location; API instance 626 searches for postings within the default radius of the third preset location. The postings in database 640 are provided by user API instances 642, 644, and 646, which receive the postings from user applications 648, 650 and 652, respectively. Although only three user API instances and user applications are shown, those skilled in the art will recognize that any number of user applications may provide content postings to content storage server 306.

In content storage server 308, each API instance 628, 630 and 632 searches a postings database 654 for postings within the default radius of the location assigned to the API instance. Thus, API instance 628 searches for postings within the default radius of the first preset location; API instance 630 searches for postings within the default radius of the second preset location; API instance 632 searches for postings within the default radius of the third preset location. The postings in database 654 are provided by user API instances 656, 658, and 660, which receive the postings from user applications 662, 664 and 666, respectively. Although only three user API instances and user applications are shown, those skilled in the art will recognize that any number of user applications may provide content postings to content storage server 308.

In content storage server 310, each API instance 634, 636 and 638 searches a postings database 668 for postings within the default radius of the location assigned to the API instance. Thus, API instance 634 searches for postings within the default radius of the first preset location; API instance 636 searches for postings within the default radius of the second preset location; API instance 638 searches for postings within the default radius of the third preset location. The postings in database 668 are provided by user API instances 670, 672, and 674, which receive the postings from user applications 676, 678 and 680, respectively. Although only three user API instances and user applications are shown, those skilled in the art will recognize that any number of user applications may provide content postings to content storage server 310.

The streams from the multiple threads are interleaved by API 602 to form the aggregate stream 690. This may require buffering in a buffer 692.

Figure 7:
FIG. 7 is an example of a postings table.

Mapping server 342 receives the aggregate stream 690, parses each XML file in the aggregate stream, and stores the parsed information in postings database 344. FIG. 7 provides an example of a table 700 in postings database 344. Table 700 includes a posting ID field 702, a location longitude field 704, a location latitude field 706, a content type field 708, a content text field 710, a content author field 712, an author image URL field 714, a content page URL field 716, a content posting time field 718, and a content posting date field 720.

Posting ID field 702 contains a unique identifier for the posting. Location longitude field 704 and location latitude field 706 contain the longitude and latitude of the location where the content was posted. Content type field 708 indicates what type of content is in the posting: text, photograph, or video, for example. Content text field 710 contains text found in the posting. For some text postings, content text field 710 contains the entire text that was posted. For photograph or video postings, content text field 710 contains text that was posted with the photograph or video. For some video postings, content text field 710 contains text of the audio portion of the video. Content text field 710 is searched to find postings that match search terms entered in filter term box 180 and query box 256.

Content author field 712 contains a name or pseudonym for the user who posted the content and author image URL field 714 contains a URL address to an image file containing an image of the user who posted the content. Content page URL field 716 contains a URL address to a page containing the posting. Content posting time field 718 and content posting date field 720 provide the time and date that the content was posted to the content storage server.

Figure 8:
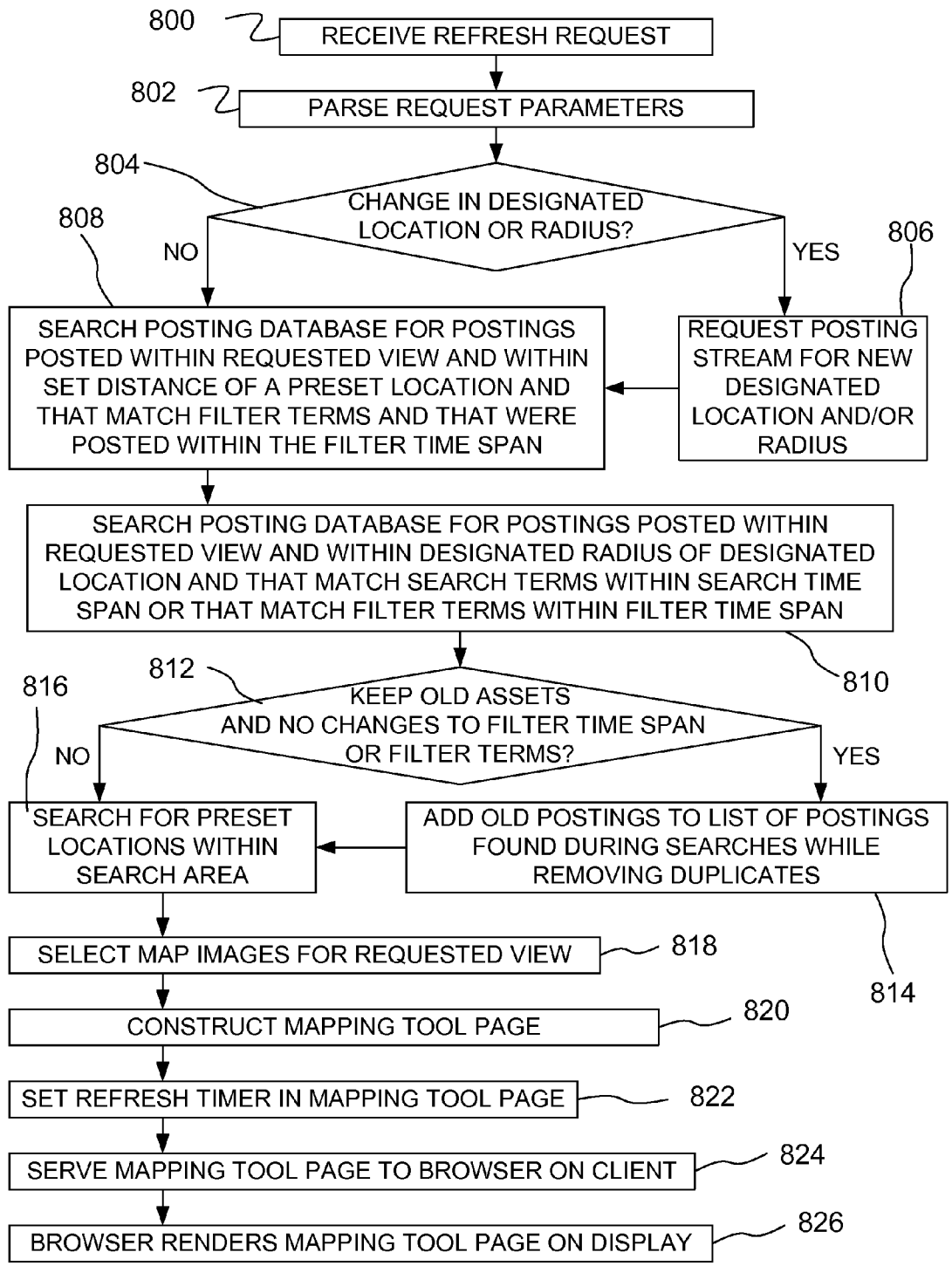
FIG. 8 is a flow diagram of steps performed in response to a refresh event.

FIG. 8 provides a flow diagram of steps performed in response to a map refresh request. In step 800, mapping server 342 receives a refresh or reading request from mapping tool 320. Such a request may be issued:

when a new search is submitted in search box 254 by entering a term in query box 256 and pressing search button 266;

when a new filter term is added to filter term box 180 using Add term button 178;

when a filter term is removed from filter term box 180 using a delete button such as delete button 187;

when the user requests a change in the map view by changing either the zoom level using zoom control 190 or by panning the view using panning control 192 or dragging the map image;

when filter time span slider 172 of filter window 170 is moved to alter the time span for postings around the preset locations;

when time span slider 262 of search box 254 is moved to alter the time span for postings around the designated location;

when a new designated location is set using Select Location button 260;

when the search radius around the designated location is altered using search radius slider 258;

when the designated location is removed using clear button 264;

when AND-OR control 196 is altered; or when refresh timer 392 in mapping tool 320 expires.

At step 802, mapping server 342 parses request parameters sent with the refresh request. These parameters include the longitude and latitude values that describe the span of the requested view, the filter time span 356, the filter terms 322, a parameter indicating whether the filter terms are to be ANDed or ORed together, search terms 325, search time span 331, designated location radius 327, designated location 326, postings currently displayed on mapping tool 320, and an indication of whether check box 182 has been selected so that old assets should be removed when mapping tool 320 is refreshed. If the refresh request was triggered by a change in any of these parameters, the value that the parameter was changed to is sent in the request.

At step 804, mapping server 342 determines if the designated location or the radius around the designated location have changed since mapping tool 320 was last refreshed. If either the designated location or the designated radius has changed, mapping server 342 requests a new stream of postings for the designated location and designated radius from aggregator server 346. If a stream of postings for a previous designated location or previous designated radius is currently open and active, mapping server 342 will request that aggregator server 346 close the previous stream before requesting the new stream. In addition, mapping server 342 will delete entries in postings database 344 for the previous designated location or the previous designated radius.

If there were no changes to the designated location or designated radius or after the new stream of postings is requested at step 806, the process of FIG. 8 continues at step 808 where mapping server 342 searches postings database 344 for postings that meet all of the following requirements: they were posted within the requested view span 354, they were posted within the set distance 349 of at least one preset location; they match filter terms 322; and they were posted within the filter time span 356. At step 810, mapping server 342 searches postings database 344 for postings that meet all of the following requirements: they were posted within the requested view span 354; they were posted within the designated radius 327 of the designated location 326; they match search terms 325; and they were posted within search time span 331. During step 810, mapping server 342 also searches postings database 344 for postings that meet all of the following requirements: they were posted within the requested view span 354; they were posted within designated radius 327 of designated location 326; they match filter terms 322; and they were posted within filter time span 356.

During steps 808 and 810, filter time span 356 and search time span 331 are used to define time ranges and the searches in steps 808 and 810 limit the postings to those postings within the time ranges. Specifically, the time range defined for filter time span 356 is defined as spanning from a current time determined just before the search is performed to a time that is before the current time by an amount equal to filter time span 356. The time range defined for search time span 331 is defined as spanning from a current time determined just before the search is performed to a time that is before the current time by an amount equal to search time span 331.

At step 812, mapping server 342 determines if check box 182 has been checked such that old postings are to be automatically removed from mapping tool page 320. If old postings are not to be automatically removed (box 182 is not checked) and if there was no change to filter time span 356 or to filter terms 322, mapping server 342 will maintain the icons currently shown on mapping tool page 320. To do this, at step 814, postings that are currently shown on mapping tool page 320 are added to the list of postings found during steps 808 and 810. Since some of the postings found during search steps 808 and 810 may already be displayed on mapping tool page 320, a posting that is currently shown on mapping tool page 320 is only added to the list of postings if the posting was not returned during search steps 808 and 810.

After step 814, or if old postings are to be removed or if filter time span 356 or filter terms 322 were modified at step 812, mapping server 342 searches preset locations database 362 for preset locations positioned within the requested view at step 816.

Figure 9:
FIG. 9 is an example of a preset locations table.

FIG. 9 provides an example table 900 of preset locations database 362. Table 900 includes a location ID field 902, a location latitude field 904, a location longitude field 906, a location type field 908, a location display name 910, a location internal name 912 and a location address 914. Location ID field 902 provides a unique identifier for the location. Location latitude field 904 and location longitude field 906 provide location values for the location. Location type field 908 indicates what type of location this is such as a store, region/group/district office, head-quarters office or government building. Location display name 910 provides a name of the location that can be displayed on display 352. Location internal name 912 contains a name for the location that may be used internally by a business or government entity. Location address 914 provides the address of the location. In accordance with some embodiments, all of the fields are returned to mapping tool 320 in response to the query for preset locations within the requested view.

At step 818, mapping server 342 selects map images from map images database 360 for the requested view.

At step 820, mapping server 342 constructs mapping tool page 320 by inserting references to the map images selected at step 818, by providing icons and position information for the icons for each posting in the list of postings, by providing icons and position information for each of the preset locations identified in step 816, by providing a semi-transparent circular overlay and position information for the overlay for the designated location and designated radius, and providing headers, menus, and controls for the mapping tool page 320.

Figure 10:
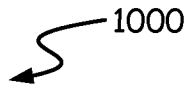
FIG. 10 is an example of an icon table.

The icons that are inserted in step 820 are taken from icon images database 364. FIG. 10 provides an example of a table 1000 in icon images database 364 that contains the icon information needed to select a correct icon. In table 1000, an icon ID field 1002 provides a unique identifier for the icon, a posting/location type field 1004 provides the posting type or the location type for the icon such as image posting, text posting, video posting, store location, head-quarters location, and government building location, for example. An icon image URL field 1006 provides a URL address for the icon image that is to be placed on the screen.

At step 822, mapping server 342 sets a refresh timer in mapping tool page 320. In accordance with one embodiment, the refresh timer is set to thirty-seconds such that after mapping tool page 320 has been rendered for thirty seconds, mapping tool page 320 will request that mapping server 342 refresh mapping tool page 320.

At step 824, mapping server 342 serves mapping tool page 320 to browser application 380 on client 321 and at step 826, browser application 380 renders mapping tool 320 on display 352.

Figure 11:
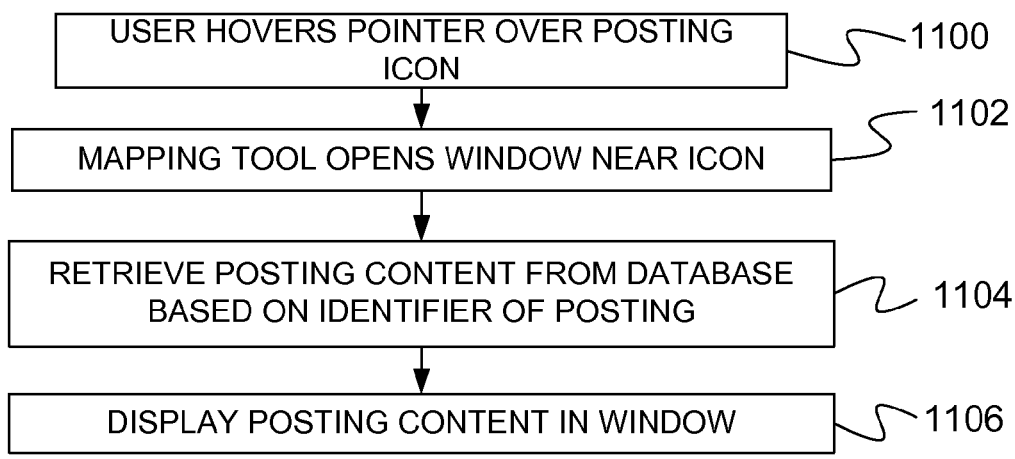
FIG. 11 is a flow diagram of steps performed in a hover event.

To receive additional information about a posting, a user can select the posting's icon or hover a pointer over the posting's icon. FIG. 11 provides a flow diagram of steps that are performed in response to a user hovering a pointer over a posting's icon.

At step 1100, a user hovers a pointer over a posting icon by placing the pointer on top of the posting icon without pressing a selection button. In response, mapping tool 320 opens a window near the posting's icon at step 1102. In accordance with one embodiment, the window appears to extend from or be expanded within the icon. At step 1104, mapping tool 320 retrieves posting content from postings database 344 of mapping server 342. The posting content may include posted text that is stored directly in postings database 344 or other content that is retrieved by using a URL address stored in postings database 344. For example, a URL for an image or a video may be used to retrieve the image or video. The retrieved content is then displayed within the window at step 1106.

Figure 12:
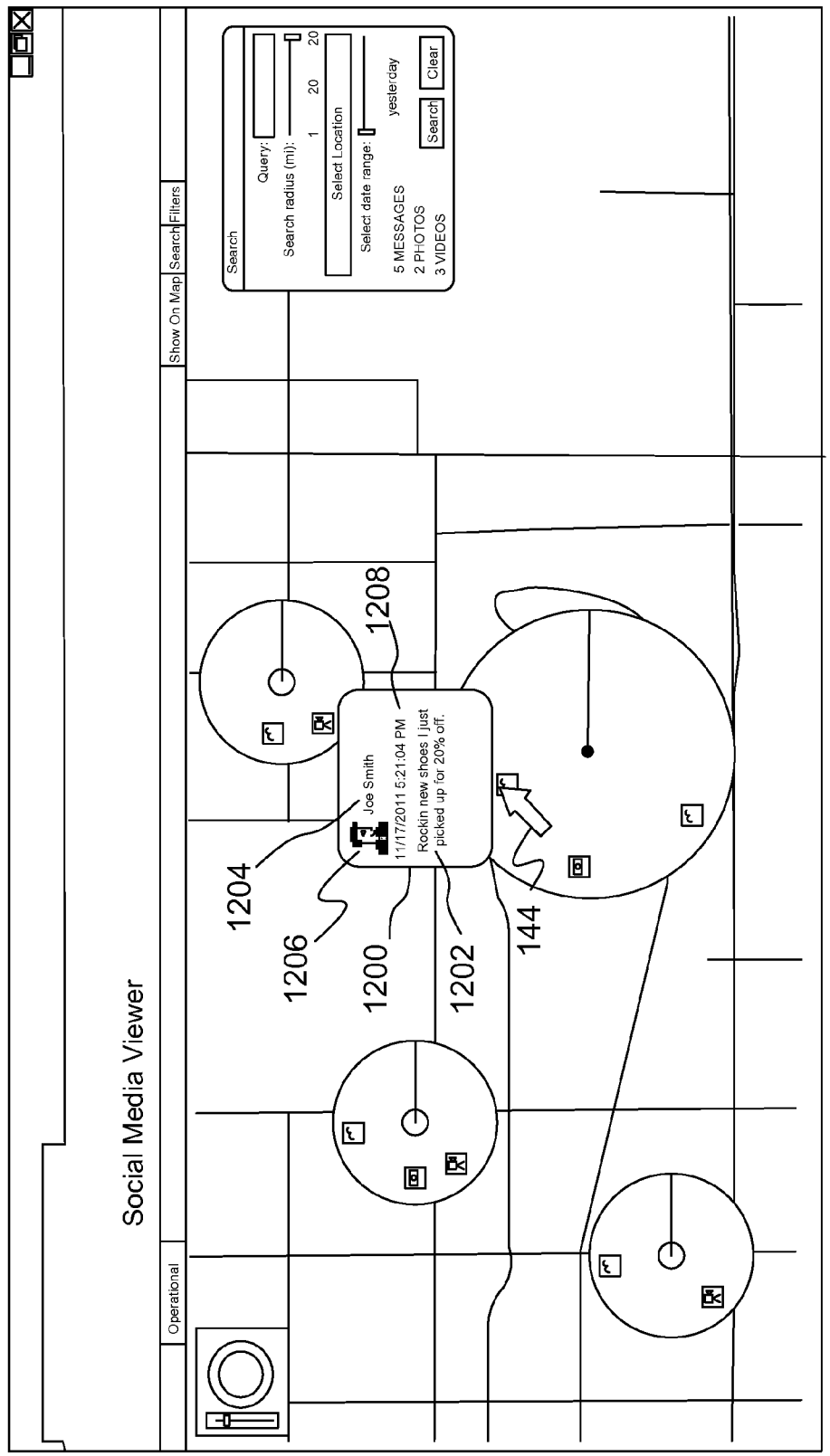
FIG. 12 is an example of a user interface with a hover over a message icon.

FIG. 12 provides an example of a window 1200 opened for a hover event over a text posting icon. Window 1200 contains the text 1202 that was posted, the name 1204 of the person who posted the text, an image 1206 associated with the person who posted the text, and a date and time 1208 when the text was posted. Image 1206 may be retrieved using the user image URL stored in postings database 344. Text 1202 may be taken directly from postings database 344 or from a URL address stored in postings database 344.

Figure 13:
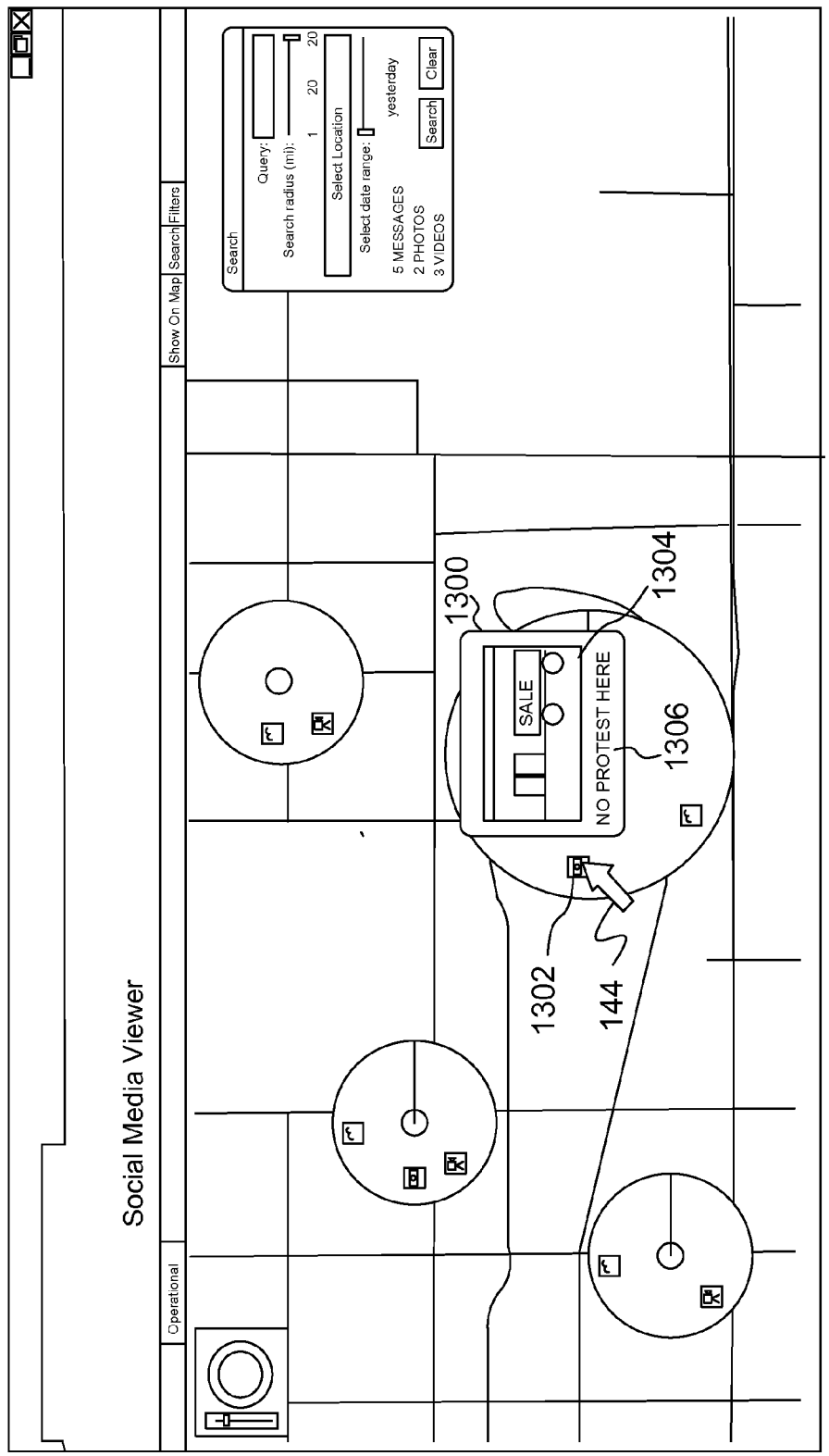
FIG. 13 is an example of a user interface with a hover over a photograph icon.

FIG. 13 provides an example of a window 1300 opened for a hover event over a photograph posting icon 1302. In window 1300, a photograph 1304 is shown with text 1306 that was posted with the photograph. Photograph 1304 may be retrieved using a URL address stored in postings database 344 and text 1306 may be retrieved directly from postings database 344 or from a URL address stored in postings database 344. In addition, photograph 1304 may have a URL address link associated with it such that if the user selects photograph 1304, a window will open that displays a web site hosted by the content storage server that provided the posting to aggregator server 346.

Figure 14:
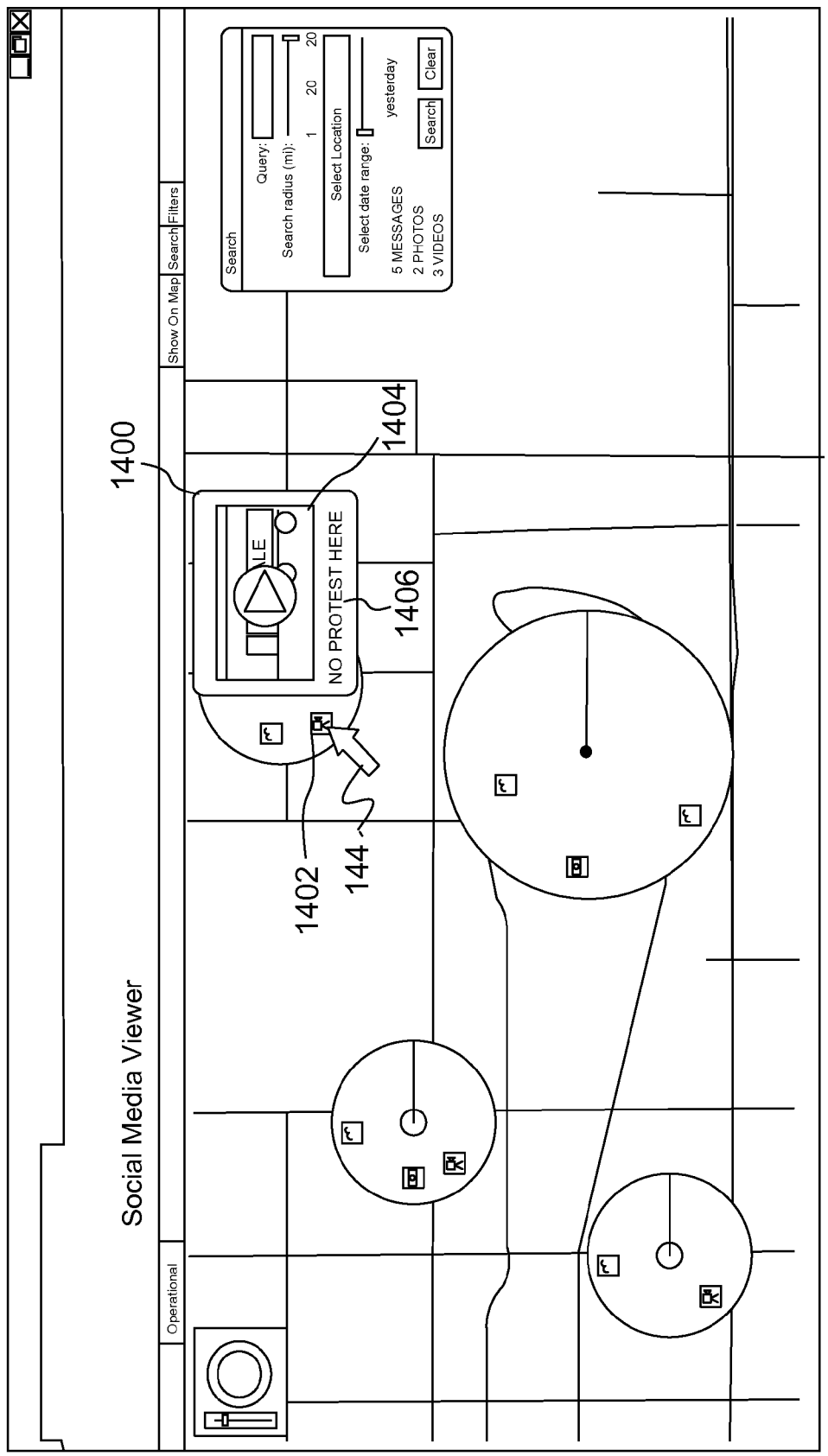
FIG. 14 is an example of a user interface with a hover over a video icon.

FIG. 14 provides an example of a window 1400 opened for a hover event over a video posting icon 1402. In window 1400, a video player 1404 that plays the posted video is shown with text 1406 that was posted with the video. The video in video player 1404 may be retrieved using a URL address stored in postings database 344 and text 1406 may be retrieved directly from postings database 344 or from a URL address stored in postings database 344. In accordance with some embodiments, a single frame of the video is shown as an image in window 1400 instead of video player 1404. In such embodiments, the image is associated with a link to a web site where the video may be played such that if the user selects the image in window 1400 a new window is opened that displays the web site with a video player in the new window.

Instead of hovering over an icon, a user can also select icon to receive additional information about a posting, a user can select the posting's icon. In accordance with some embodiments, selecting an icon produces the same windows as hovering over the icon and as described above for FIGS. 11-14. In accordance with other embodiments, selecting a posting icon opens a window in which a web site associated with one of the content storage servers 306, 308, and 310 is rendered.

Figure 15:
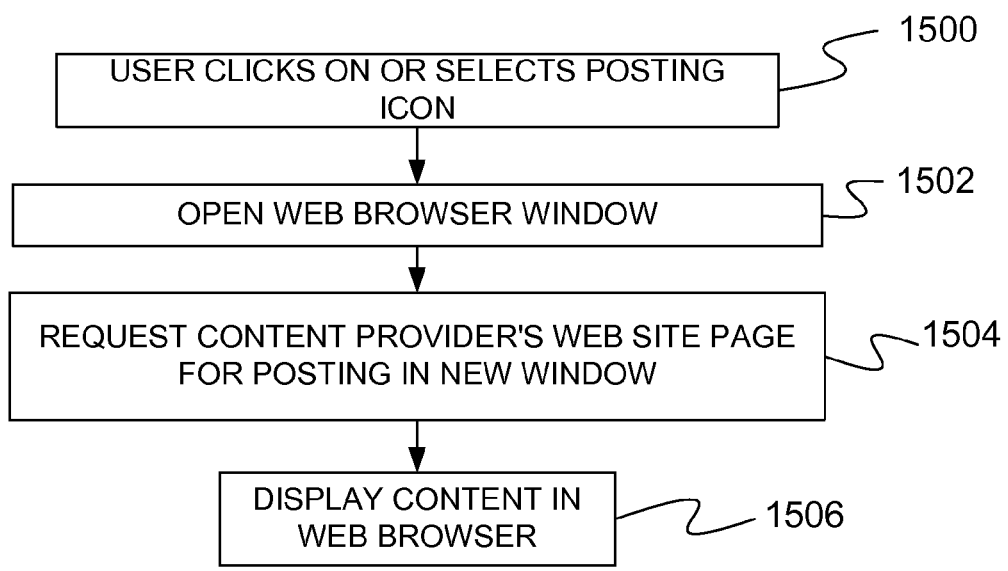
FIG. 15 is a flow diagram of steps performed in a click event.

FIG. 15 provides a flow diagram of steps performed in response to a "click on icon" event. At step 1500, a user clicks on or otherwise selects a posting icon. At step 1502, mapping tool 320 opens a web browser window. At step 1504, mapping tool 320 requests a web site page containing the posted content. In particular, mapping tool 320 uses a URL address for a page hosted by a server associated with one of the content storage servers 306, 308, and 310 and stored within mapping tool 320 as part of icon types and positions 390. The returned page is then displayed in the web browser window at step 1506.

Figure 16:
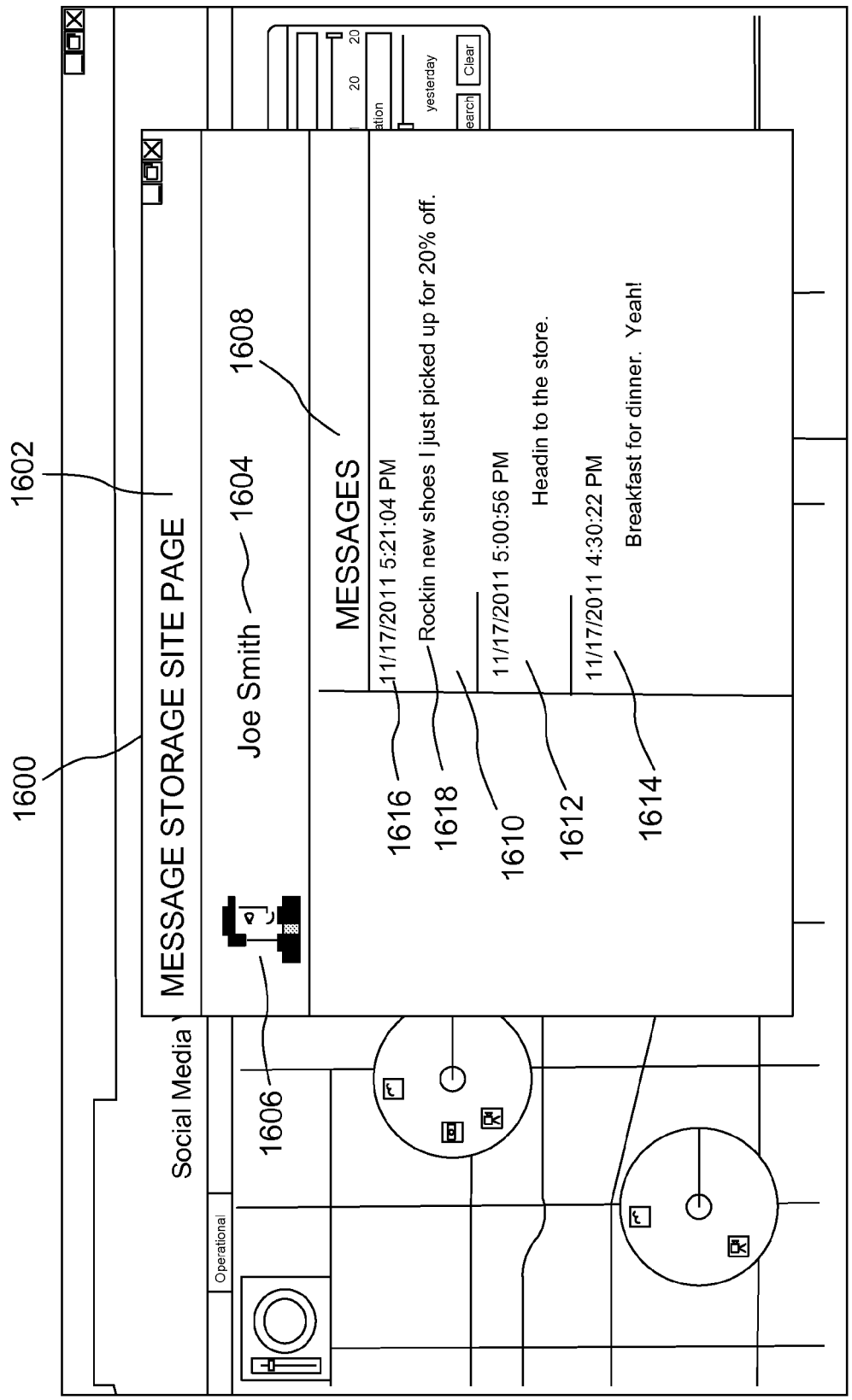
FIG. 16 is an example of a user interface after a click on a message icon.

FIG. 16 provides an example of a user interface after a user has clicked on a text posting icon. In FIG. 16, a browser window 1600 has been opened. Within browser window 1600, a posted text page 1602 is displayed the user associated with the text posting icon. Posted text page 1602 includes the name 1604 of the user, an image 1606 for the user, and a column 1608 of messages posted by the user. Message column 1608 includes posted messages 1610, 1612, and 1614, which each include a date and time when the message was posted, such as date and time 1616, and the content of the message, such as message content 1618.

Figure 17:
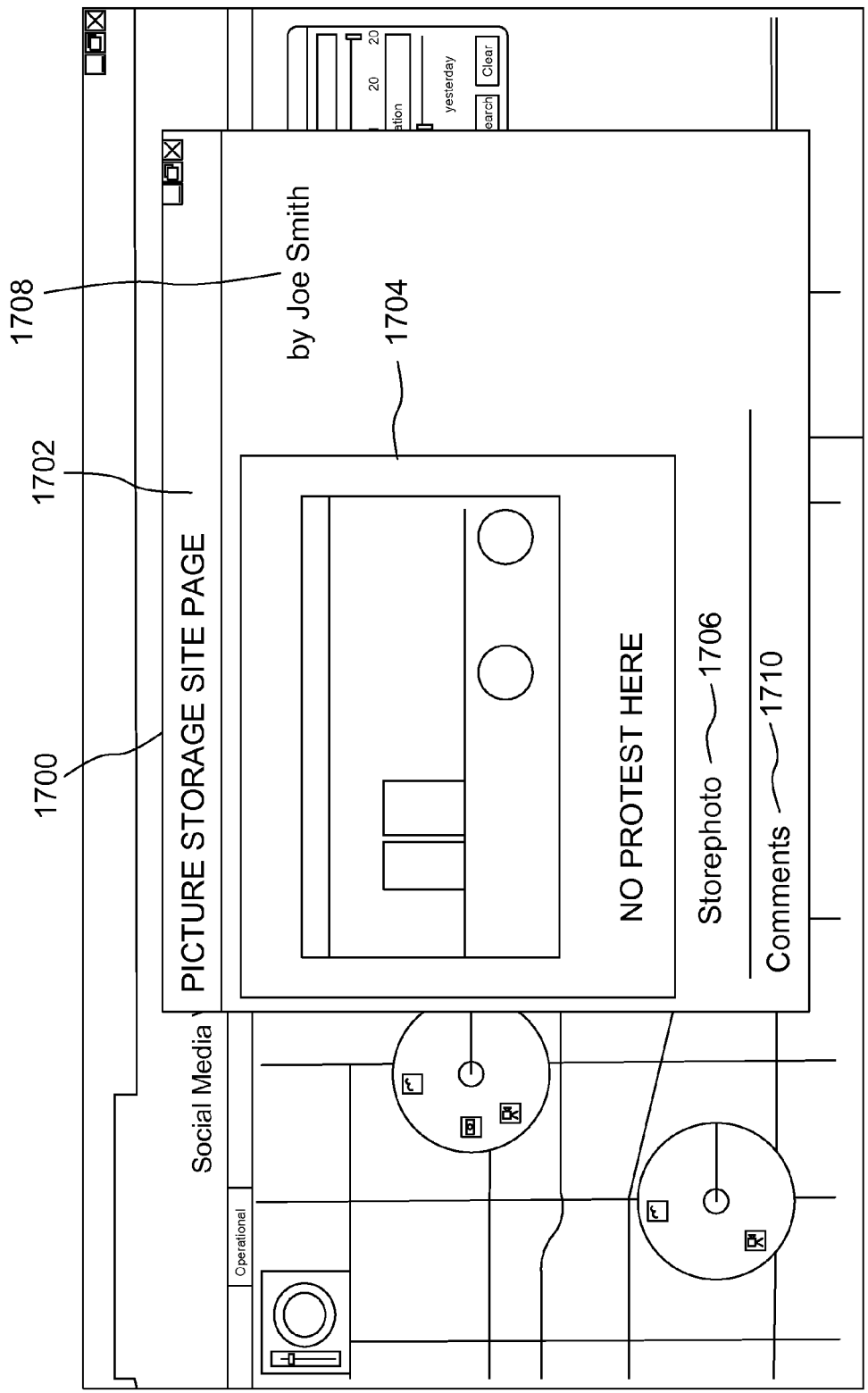
FIG. 17 is an example of a user interface after a click on a photograph icon.

FIG. 17 provides an example of a user interface after a user has clicked on a photograph posting icon. In FIG. 17, a browser window 1700 has been opened. Within browser window 1700, a posted photograph page 1702 is displayed showing the posted photograph 1704, a title 1706 for the photograph, the name 1708 of the person who posted the photograph, and a comments section 1710 that allows other users to post comments about the photograph.

Figure 18:
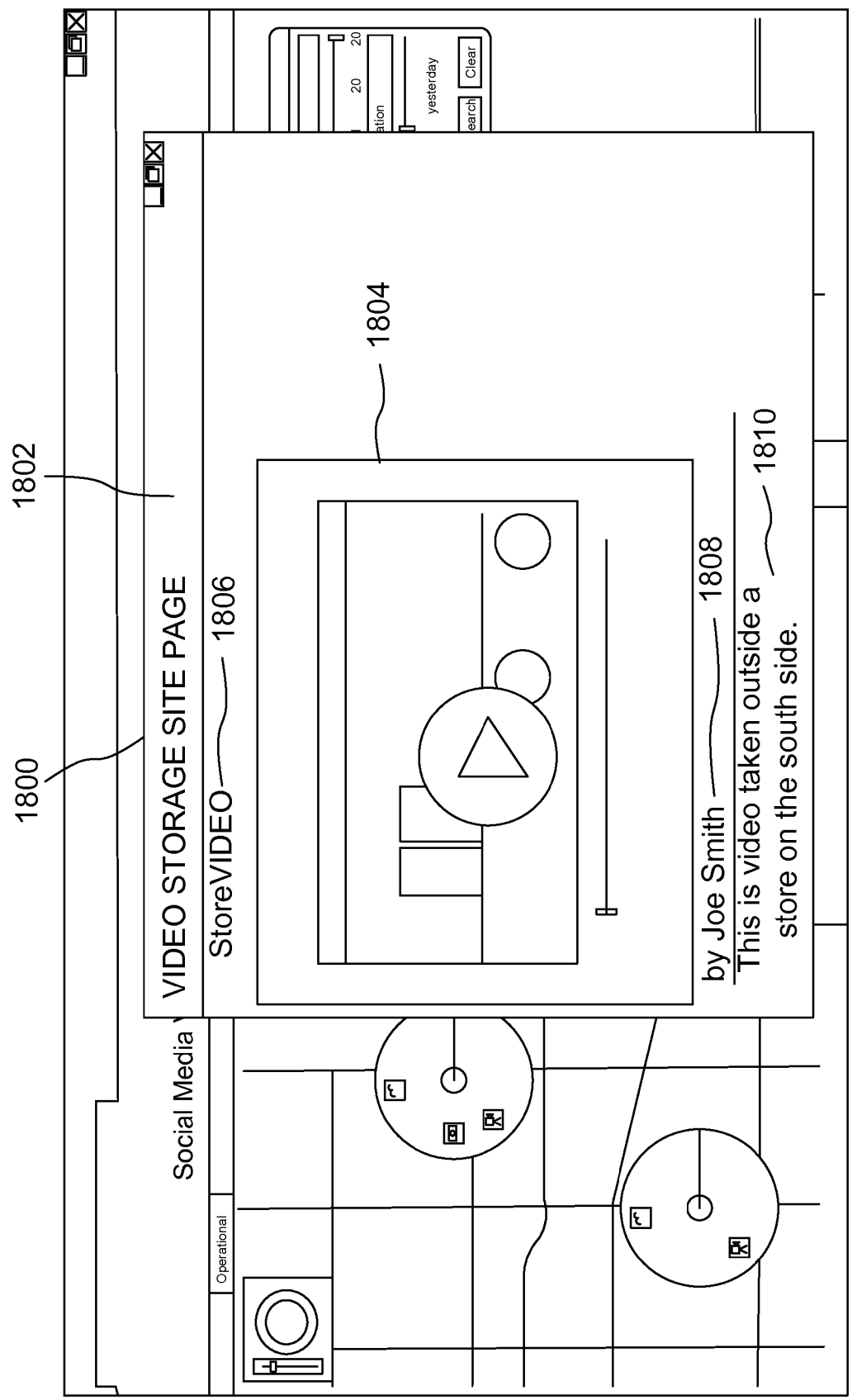
FIG. 18 is an example of a user interface after a click on a video icon.

FIG. 18 provides an example of a user interface after a user has clicked on a video posting icon. In FIG. 18, a browser window 1800 has been opened. Within browser window 1800, a posted video page 1802 is displayed showing a video player 1804 programmed to play the posted video, a title 1806 for the video, the name 1808 of the person who posted the video, and a summary 1810 that describes the content of the video.

Figure 19:
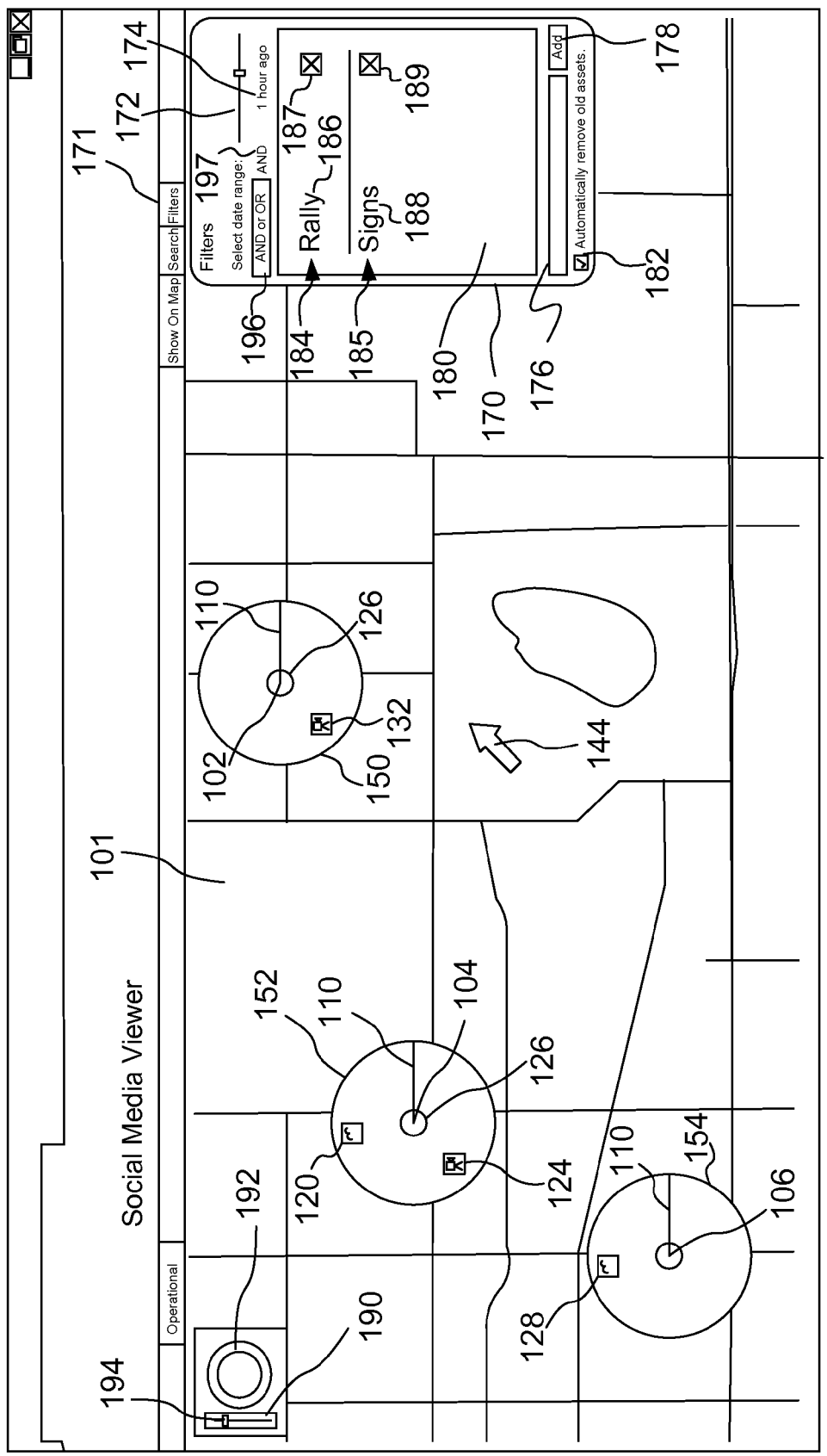
FIG. 19 is an example of a user interface after a reduction in a time span.

FIG. 19 shows an example of a user interface showing a mapping output after the time span has been adjusted. In particular, FIG. 19 shows the changes in the mapping output of FIG. 1 after the time span slider 172 is changed from one day to one hour. As can be seen in FIG. 19, posting icons 122 and 130 of FIG. 1 have been removed from the mapping output because they were posted more than one hour ago.

Figure 20:
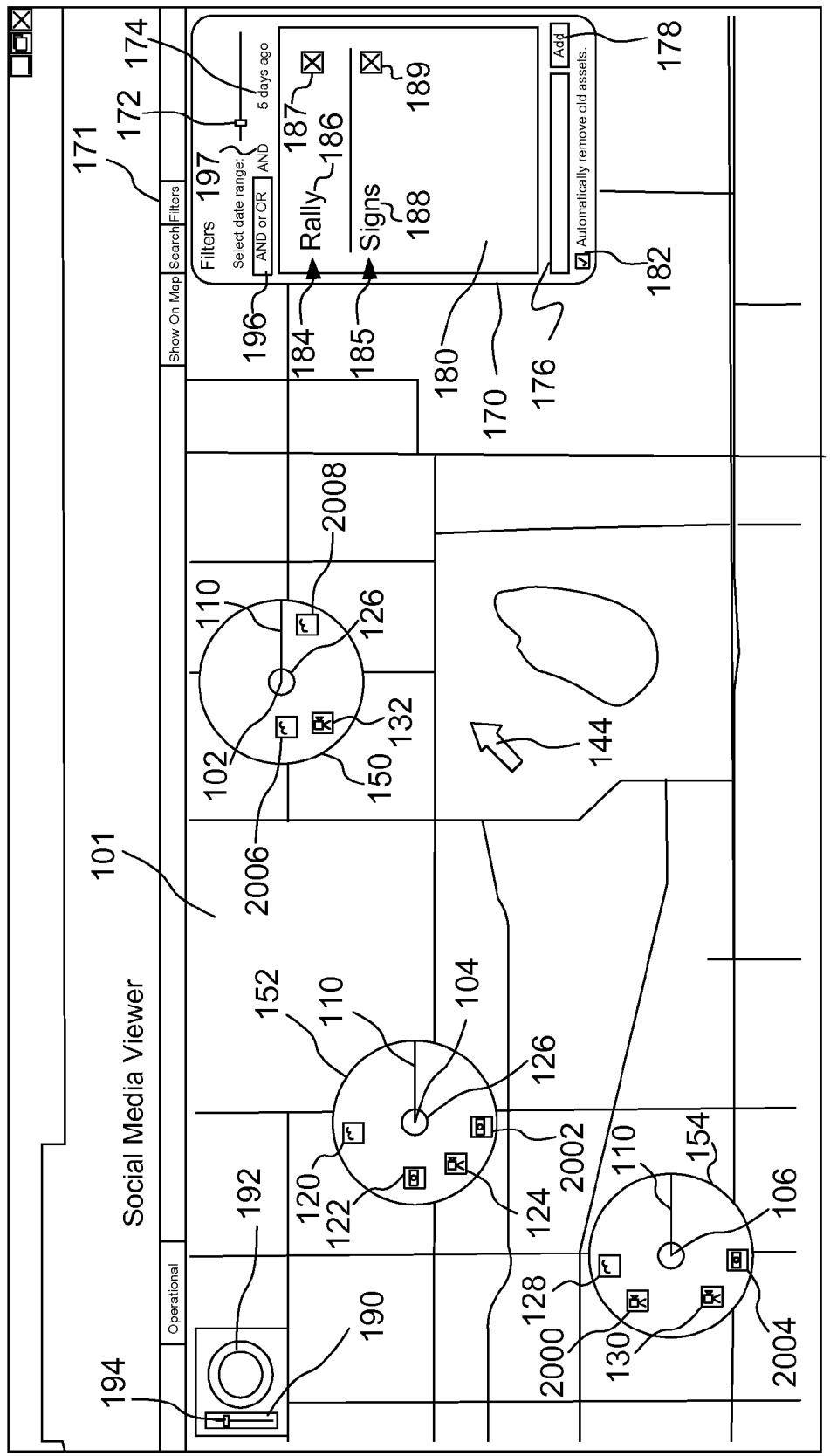
FIG. 20 is an example of a user interface after an increase in a time span.

FIG. 20 shows an example of a user interface showing a mapping output after the time span has been lengthened. In particular, FIG. 20 shows the changes in the mapping output of FIG. 1 after the time span is changed from one day to five days. As can be seen in FIG. 20, posting icons 2000, 2002, 2004, 2006, and 2008 have been added because the postings were made between one day ago and five days ago.

Note that in FIGS. 19 and 20, the search terms remained the same and only the time span changed.

Figure 21:
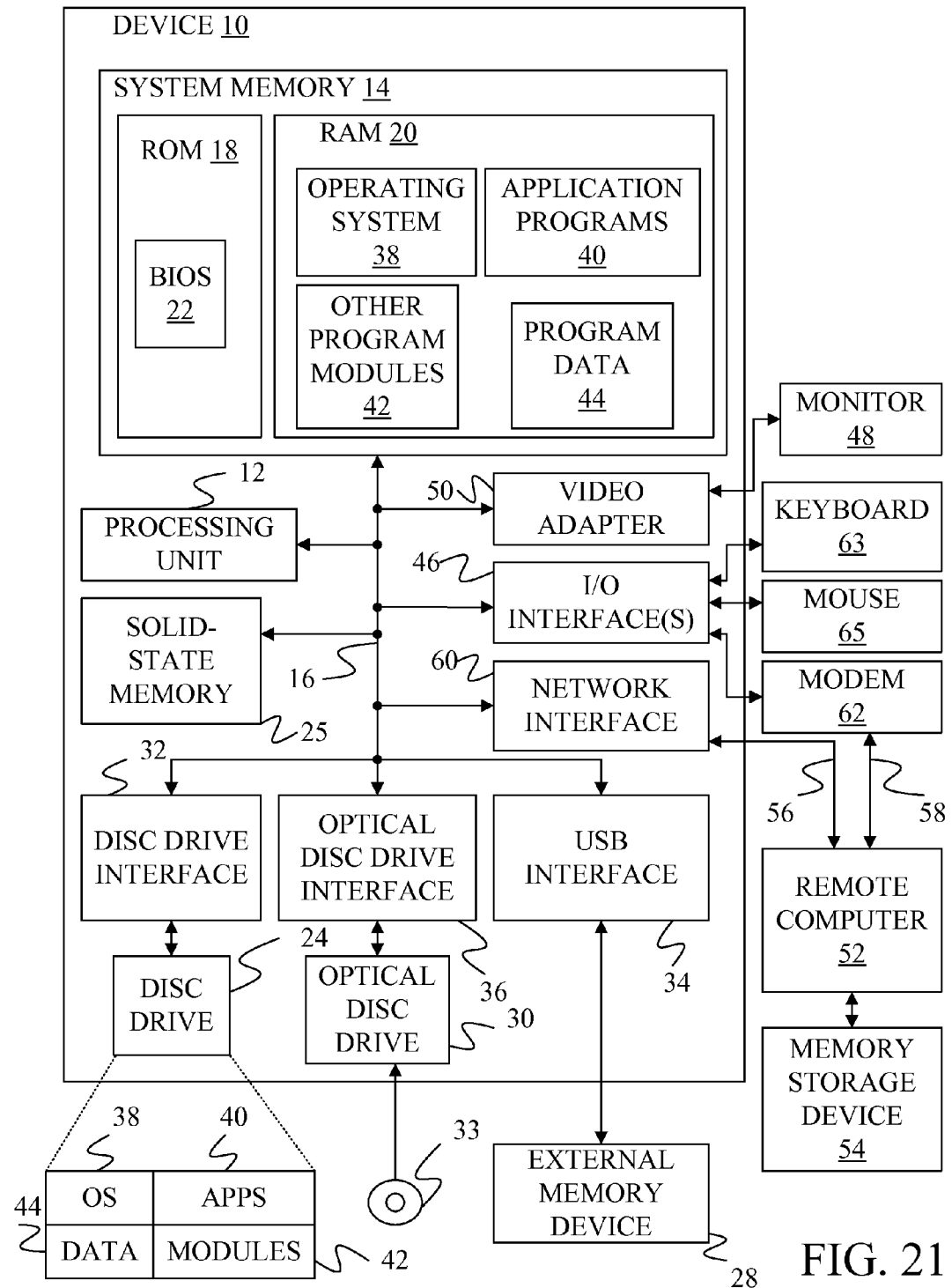
FIG. 21 is a block diagram of an example of a computing device that may be used as either a server or a client device.

An example of a computing device that can be used as a server and/or client device in the various embodiments is shown in the block diagram of FIG. 21. The computing device 10 of FIG. 21 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 33. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include mapping tool 320, and application programs executed on mapping server 342, aggregator server 346 and content storage servers 306, 308, and 310. Program data 44 may include text, images, and video of postings and data stored in one or more of the database described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 21. The network connections depicted in FIG. 21 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 21 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving from a content posting recipient content posting location parameters including one or more set distances from a plurality of locations within which content postings must be posted before the content posting can be transmitted to a content posting receiving and viewing device of the content posting recipient wherein the one or more set distances from a plurality of locations include a set distance from a first location and a set distance from a second location;
    receiving information about content postings from at least one content storage server wherein the information about content postings is posted by a content poster, and wherein the received information is limited to content postings that are posted from within a set distance of at least one of the first and second locations such that information for at least one excluded content posting is excluded from being received because the excluded content posting was posted farther than the set distance from the first location and the set distance from the second location;
    storing the received information in a database;
    searching the database for information about content postings that were posted within a first time span set by the content posting recipient to identify a plurality of content postings, wherein a first identified content posting was posted within the set distance of the first location and a second identified posting was posted within the set distance of the second location; and
    generating, using a processor, a first web page to be displayed to the content postings recipient, wherein the first web page displays icons for each of the plurality of content postings that were identified during the searching.

2. The method of claim 1 wherein searching the database further comprises searching the database for information about content postings that contain a term provided by the content posting recipient.

3. The method of claim 2 wherein the first time span is adjustable by the content posting recipient.

4. The method of claim 3 further comprising:
    receiving a request for a second web page, the request comprising a second time span;
    performing a second search of the database for information about content postings that were posted within the second time span to identify a second plurality of content postings; and
    generating, using a processor, the second web page to display icons for each of the plurality of content postings that were identified during the second search of the database.

5. The method of claim 4 wherein the first time span is longer than the second time span and the first web page comprises more icons than the second web page.

6. The method of claim 4 further comprising during a time period between generating the first web page and receiving the request for the second web page:
    receiving information about additional content postings, wherein the information is limited to additional content postings that are posted from within the set distance of at least one of the plurality of locations; and
    storing the received information about the additional content postings in the database.

7. The method of claim 4 wherein the request for a second web page comprises a second term provided by the content posting recipient.

8. The method of claim 7 wherein performing a second search of the database for information about content postings that were posted within the second time span to identify a second plurality of content postings further comprises requiring that the content postings include the second term provided by the content posting recipient.

9. The method of claim 1 wherein the content postings comprise three separate content types consisting of text, photograph, and video.

10. A system comprising:
    at least one processor that receives from a content posting recipient content posting location parameters including one or more set distances from a plurality of locations within which content postings must be posted before the content posting can be transmitted to a content posting receiving and viewing device of the content posting recipient wherein the one or more set distances from a plurality of locations include a set distance from a first location and a set distance from a second location;
    a database server that receives information about content postings from at least one content storage server wherein the information about content postings is posted by a content poster, and wherein the received information is limited to content postings that are posted from within a set distance of at least one of the first and second locations such that information for at least one excluded content posting is excluded from being received because the excluded content posting was posted farther than the set distance from the first location and the set distance from the second location;
    a content posting recipient device that makes a reading request for information from the database server about content posted to the at least one content storage server with the content posting location parameters set by the content posting recipient and within a span of time selected by the content posting recipient, the content posting recipient device being separate from the data base server, and wherein the span of time is a time period during which the information was posted to the at least one content storage server; and, the at least one processor, in response to the reading request, searches a database of the database server for information about content postings that were posted within a first time span set by the content posting recipient to identify a plurality of content postings, wherein a first identified content posting was posted within the set distance of the first location and a second identified posting was posted within the set distance of the second location.

11. The system of claim 10 wherein the database server constructs a web page and returns the web page to the content posting recipient device in response to the reading request for information.

12. The system of claim 11 wherein the database server defines positions on the web page for icons representing the content posted to a plurality of content storage servers.

13. The system of claim 12 wherein at least two of the plurality of content storage servers store different types of posted content.

14. The system of claim 10 wherein the reading request comprises a request for posted content that contains search terms provided by the content posting recipient.

15. The system of claim 10 wherein the content posting recipient device is further configured to receive a second span of time selected by the content posting recipient and in response make a second reading request for information from the database server about content posted to the plurality of content storage servers within the second span of time.

16. A method comprising:
providing a database server that stores information about content postings posted to multiple content storage servers from only posting locations that are positioned within a radius of a plurality of preset locations, wherein the radius and the plurality of preset locations are provided by a content posting recipient;
providing a content posting recipient device that makes a reading request for information from the database server about content postings posted to the multiple content storage servers within a span of time selected by a content posting recipient, the content posting recipient device being separate from the database server, and wherein the span of time is a time period during which the information was posted to the multiple data base servers, the time period is from a first time to a second time where the first time is a time no earlier than a time of the reading request and the second time is a time prior to the first time; and,
using at least one processor, providing a user interface on the content posting recipient device, the user interface allowing a content posting recipient receiving information about content postings to independently vary each of the following: (i) the radius of each of the plurality of preset locations; and (ii) the span of time for a reading request for information within the radius of each of the plurality of preset locations wherein the span of time is a time period during which the content postings must have been posted.

17. The method of claim 16 wherein the user interface includes a map having a plurality of sections, each of the plurality of sections includes a graphical representation of an area around one of the plurality of preset locations defined by the content posting recipient and each of the plurality of sections further includes a first icon and a second icon, the first icon representing a first form of content posted and the second icon representing a second form of content posted wherein the first form of content posted is different from the second form of content posted.

18. The method of claim 17 further including the step of:
providing a display area on the map when a content posting recipient interacts with the first icon, the display area includes each of the following: (i) information identifying a person that posted content corresponding to the first icon; (ii) information identifying by time and by date when content was posted corresponding to the first icon; and (iii) content corresponding to the first icon in at least one of the following forms: text, picture and video.

19. The method of claim 17 wherein the user interface includes a search icon button and a filter icon button, the search icon button when activated by a content posting recipient generates on the user interface a search box for adding on the map one or more graphical representations of one or more additional areas from which information about content postings is to be captured provided that the information is posted within the one or more additional areas and the filter icon button when activated by a content posting recipient generates on the user interface a filter window for filtering out undesired content posted.

20. The method of claim 19 wherein the search box further allows a content posting recipient to create different filtering parameters for each additional area added by a content posting recipient using the search box.

* * * * *